United States Patent
Asaka et al.

(10) Patent No.: US 10,101,450 B2
(45) Date of Patent: Oct. 16, 2018

(54) MEDICAL IMAGE PROCESSING APPARATUS, A MEDICAL IMAGE PROCESSING METHOD AND A MEDICAL DIAGNOSIS APPARATUS

(71) Applicant: TOSHIBA MEDICAL SYSTEMS CORPORATION, Otawara-Shi (JP)

(72) Inventors: Saori Asaka, Yokohama (JP); Satoshi Kawata, Yokohama (JP); Yukinobu Sakata, Kawasaki (JP); Toshiyuki Ono, Kawasaki (JP); Nobuyuki Matsumoto, Inagi (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 15 days.

(21) Appl. No.: 14/937,037

(22) Filed: Nov. 10, 2015

(65) Prior Publication Data
US 2016/0140738 A1    May 19, 2016

(30) Foreign Application Priority Data
Nov. 13, 2014    (JP) .................................. 2014-230632

(51) Int. Cl.
*G06K 9/00* (2006.01)
*G01S 15/89* (2006.01)

(52) U.S. Cl.
CPC ...... *G01S 15/8995* (2013.01); *G01S 15/8915* (2013.01); *G01S 15/8952* (2013.01); *G01S 15/8945* (2013.01)

(58) Field of Classification Search
CPC .................................................. G01S 15/8995
See application file for complete search history.

(56) References Cited

U.S. PATENT DOCUMENTS

| | | | | |
|---|---|---|---|---|
| 6,416,477 | B1 * | 7/2002 | Jago | G01S 7/52065 600/447 |
| 8,343,054 | B1 * | 1/2013 | Tamura | A61B 8/0841 600/437 |
| 2004/0006266 | A1 * | 1/2004 | Ustuner | A61B 8/08 600/407 |
| 2004/0073112 | A1 | 4/2004 | Azuma et al. | |
| 2004/0077946 | A1 | 4/2004 | Ohmiya | |

(Continued)

FOREIGN PATENT DOCUMENTS

| | | |
|---|---|---|
| JP | 2000-51210 | 2/2000 |
| JP | 2004-129773 | 4/2004 |

(Continued)

OTHER PUBLICATIONS

Japanese Office Action dated Jun. 26, 2018 for Japanese Patent Application No. 2014-230632.

*Primary Examiner* — Oneal R Mistry
(74) *Attorney, Agent, or Firm* — Oblon, McClelland, Maier & Neustadt, L.L.P.

(57) ABSTRACT

According to one embodiment, a medical image processing apparatus includes storage circuitry and processing circuitry. The storage circuitry stores a plurality of images acquired by transmitting ultrasonic waves in different scanning parameters to a target region. The processing circuitry separates a pixel value of a pixel in the images into at least two components. The processing circuitry forms a compound image concerning to the images by using at least one of the components.

18 Claims, 11 Drawing Sheets

(56) References Cited

U.S. PATENT DOCUMENTS

| | | | |
|---|---|---|---|
| 2008/0075375 A1* | 3/2008 | Unal | G06K 9/621 |
| | | | 382/243 |
| 2008/0194958 A1 | 8/2008 | Lee et al. | |
| 2010/0240996 A1* | 9/2010 | Ionasec | G06T 7/0016 |
| | | | 600/443 |
| 2012/0059263 A1* | 3/2012 | Lee | A61B 8/5269 |
| | | | 600/441 |
| 2012/0172700 A1* | 7/2012 | Krishnan | A61B 6/032 |
| | | | 600/407 |
| 2014/0046187 A1 | 2/2014 | Taniguchi et al. | |
| 2015/0371420 A1* | 12/2015 | Yerushalmy | G06T 3/4038 |
| | | | 382/284 |

FOREIGN PATENT DOCUMENTS

| | | |
|---|---|---|
| JP | 2004-154567 | 6/2004 |
| JP | 2005-296331 A | 10/2005 |
| JP | 2010-029281 A | 2/2010 |
| JP | 2010-29281 A | 2/2010 |
| JP | 2014-33914 | 2/2014 |
| WO | WO 2007/018338 A1 | 2/2007 |

\* cited by examiner

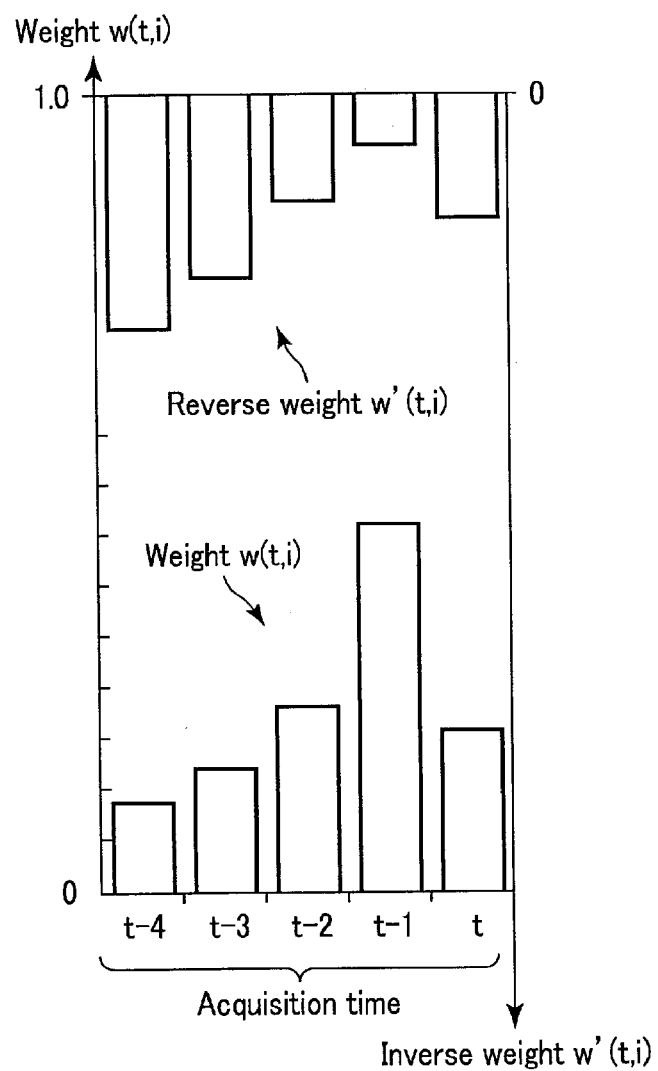
F I G. 4

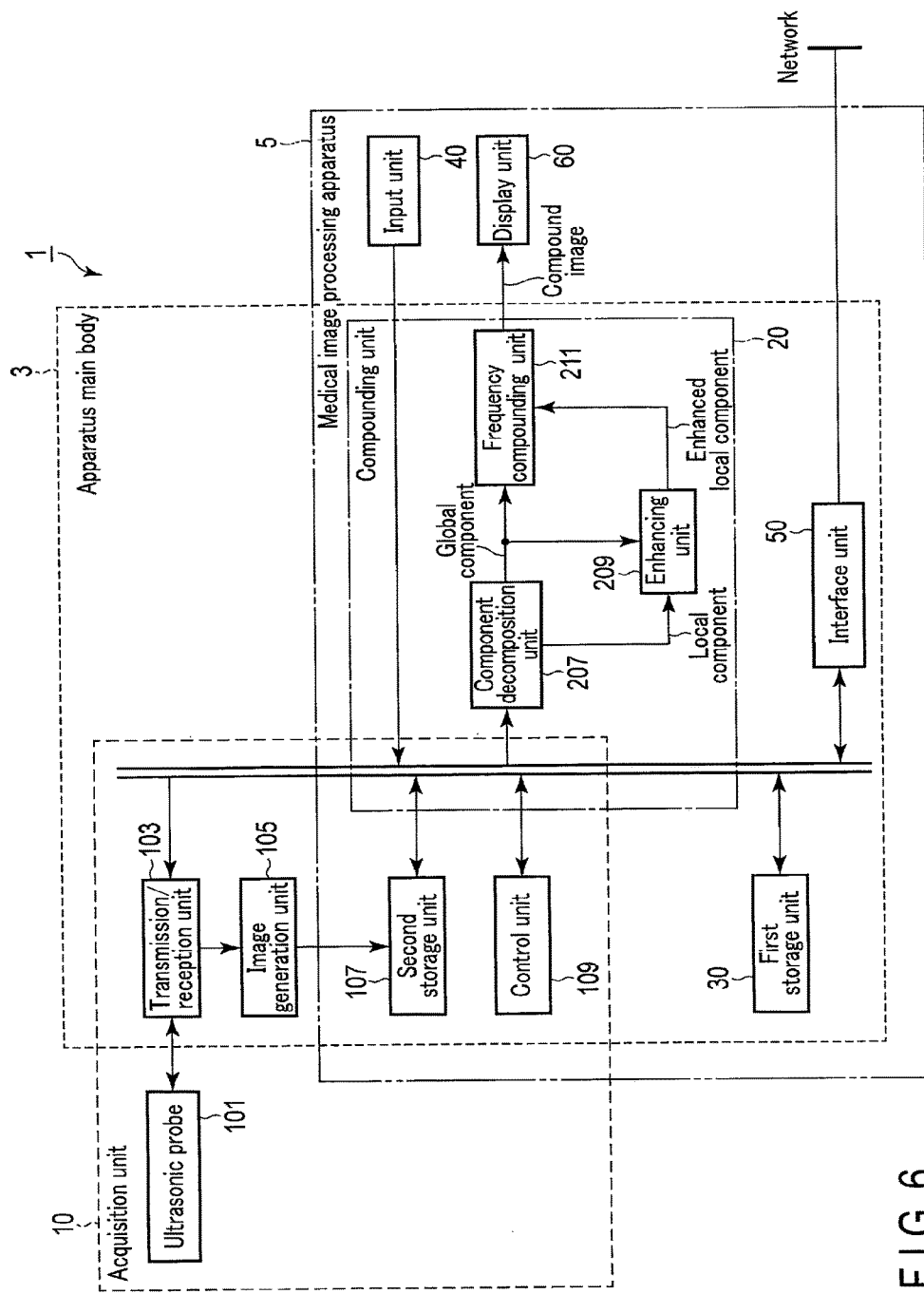
F I G. 6

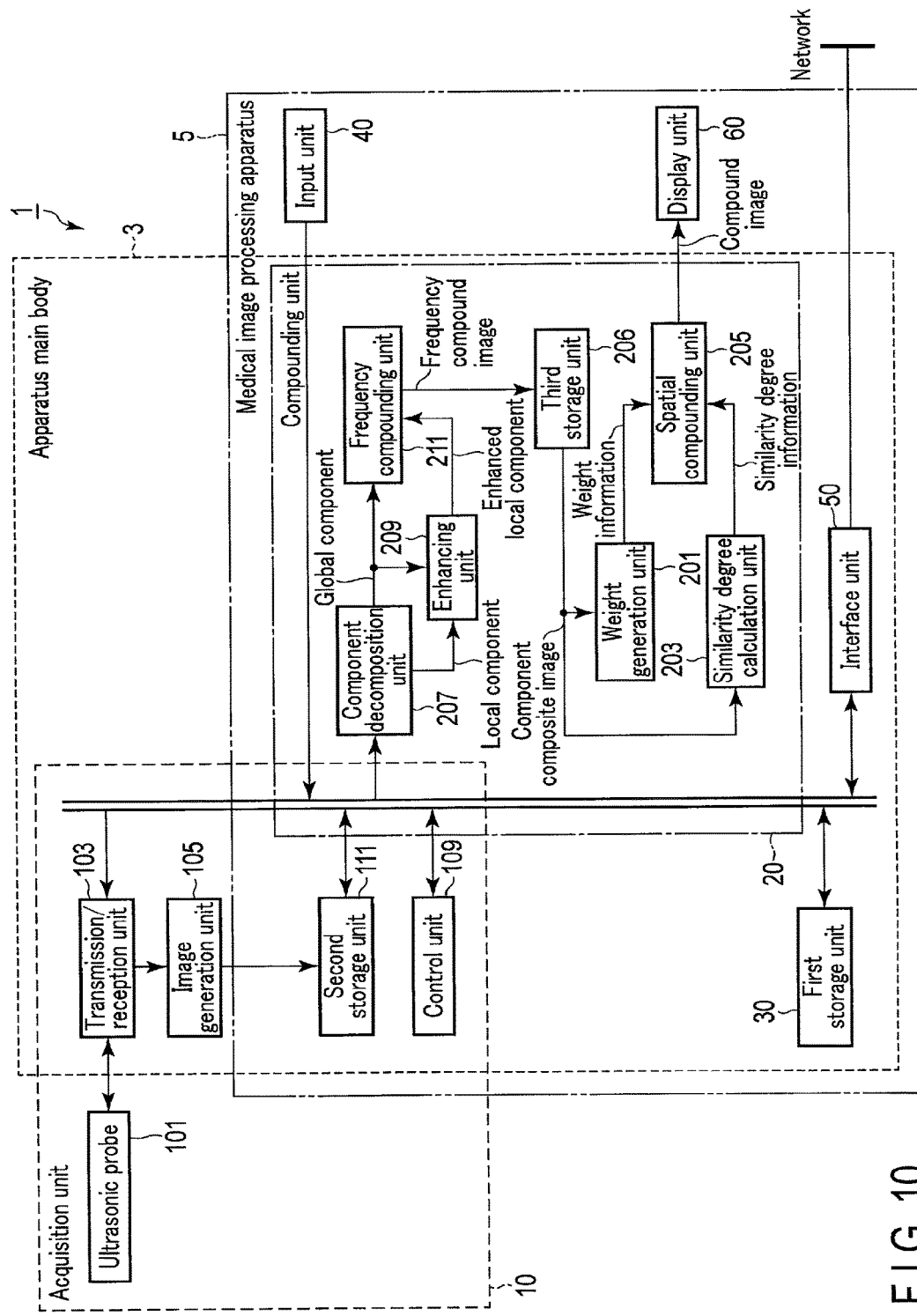
F I G. 10

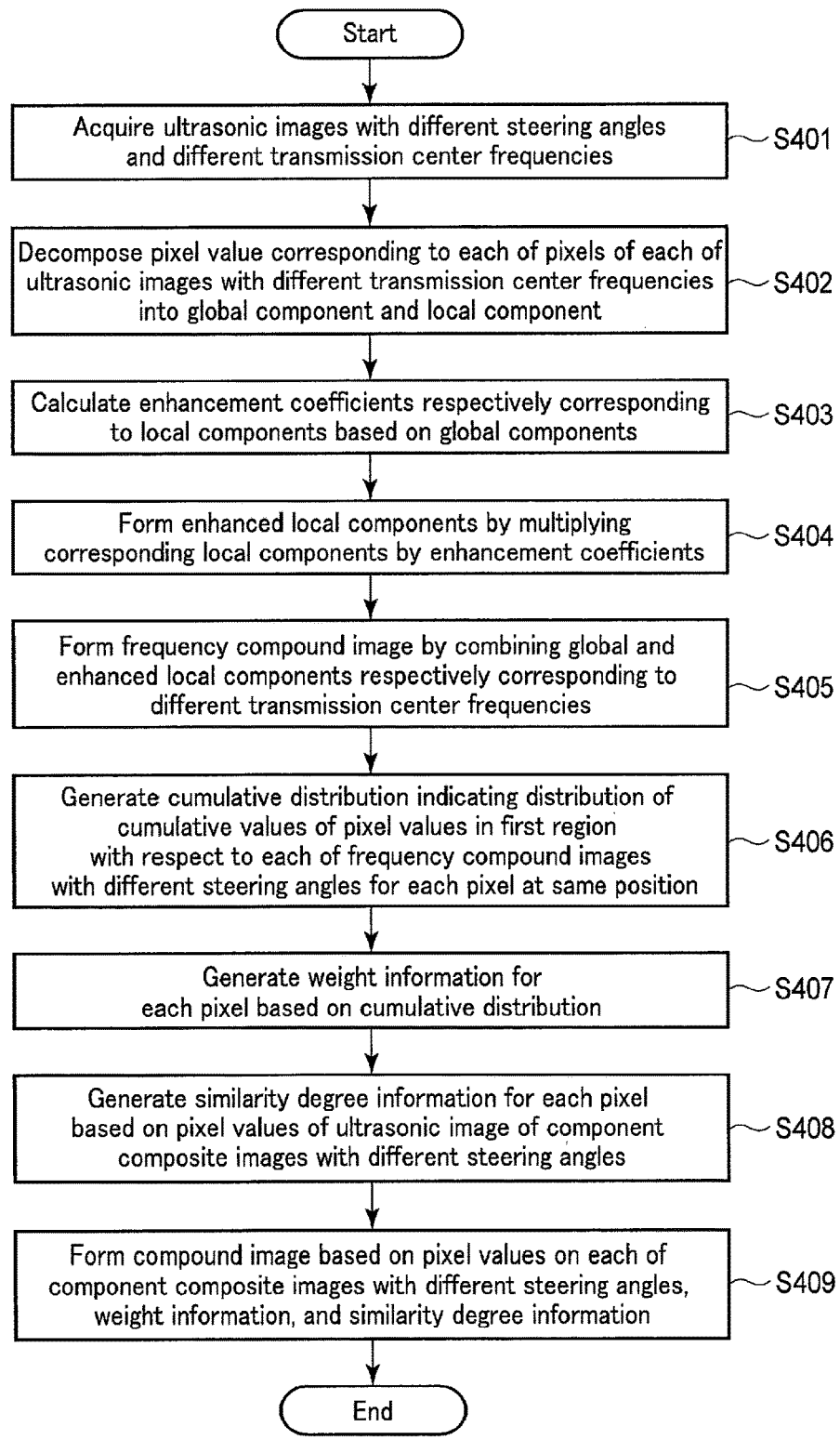
F I G. 11

MEDICAL IMAGE PROCESSING APPARATUS, A MEDICAL IMAGE PROCESSING METHOD AND A MEDICAL DIAGNOSIS APPARATUS

CROSS-REFERENCE TO RELATED APPLICATIONS

This application is based upon and claims the benefit of priority from the Japanese Patent Application No. 2014-230632, filed Nov. 13, 2014, the entire contents of all of which are incorporated herein by reference.

FIELD

Embodiments described herein relate generally to a medical image processing apparatus, a medical image processing method and a medical diagnosis apparatus.

BACKGROUND

Medical ultrasonic diagnostic apparatuses allow easy observation of the inside of the patient body in real time while imposing a light burden on the body, and hence are used in various fields of clinical scene. An ultrasonic diagnostic apparatus displays an image with luminances corresponding to the intensities of reflected echoes. The intensity of a reflected echo is decided by a beam angle onto the boundary surface between tissues such as a joint and a blood vessel and the acoustic impedances unique to the tissues. For this reason, if an ultrasonic beam (transmitted ultrasonic wave) does not vertically insonified a body tissue, since the intensity of the reflected echo is weakened, the tissue may not be accurately shown. In addition, visibility is impaired by speckle noise or random noise in the observation, which is generated by interference with the reflected echo or scattered wave.

In order to solve the above problem, for example, there is available a technique of transmitting/receiving ultrasonic waves in different beam directions, evaluating the anisotropy of the reflection of ultrasonic waves from obtained signals or the image data generated from the signals, and compounding images based on the anisotropy.

In addition, generated images differ in the continuity of body tissues and speckle noise patterns depending on the frequency bands of received ultrasonic beams. For example, an image obtained with a low-frequency beam is high in the continuity of a body tissue, while speckle noise is frequently observed to impair the visibility of the image. Speckle noise is not noticeable on an image obtained with a high-frequency beam. However, since the continuity of the body tissue is low, the body tissue as a diagnosis target is displayed as a non-contiguous image. This disturbs diagnosis.

There is available a technique of simultaneously receiving reflected beams having different frequencies and performing weighted averaging of the two reflected beams to solve the above problem.

However, the technique of evaluating the anisotropy of the reflection of ultrasonic waves from obtained signals or the image data generated from the signals and compounding images based on the anisotropy is designed to calculate the anisotropy using a single pixel. For this reason, when evaluating anisotropy on an ultrasonic image with a lot of noise, the influence of noise will lead to erroneous evaluation. In this case, noise is enhanced instead of the tissue, resulting in a failure to sufficiently depict the tissue.

In addition, the technique of simultaneously receiving reflected beams of different frequencies and performing weighted averaging of the two reflected beams is designed to combine high and low frequency components by simple weighted averaging. The resultant image is therefore an intermediate compound image. That is, this technique does not take full advantages of the respective frequency components.

BRIEF DESCRIPTION OF THE DRAWING

FIG. 4 is a graph concerning reverse weights according to the first embodiment.

FIG. 6 is a block diagram showing the arrangement of an ultrasonic diagnostic apparatus 1 according to the second embodiment.

FIG. 10 is a block diagram showing the arrangement of an ultrasonic diagnostic apparatus according to the fourth embodiment.

FIG. 11 is a flowchart showing an example of a procedure for frequency-spatial compounding processing according to the fourth embodiment.

DETAILED DESCRIPTION

Figure 1:
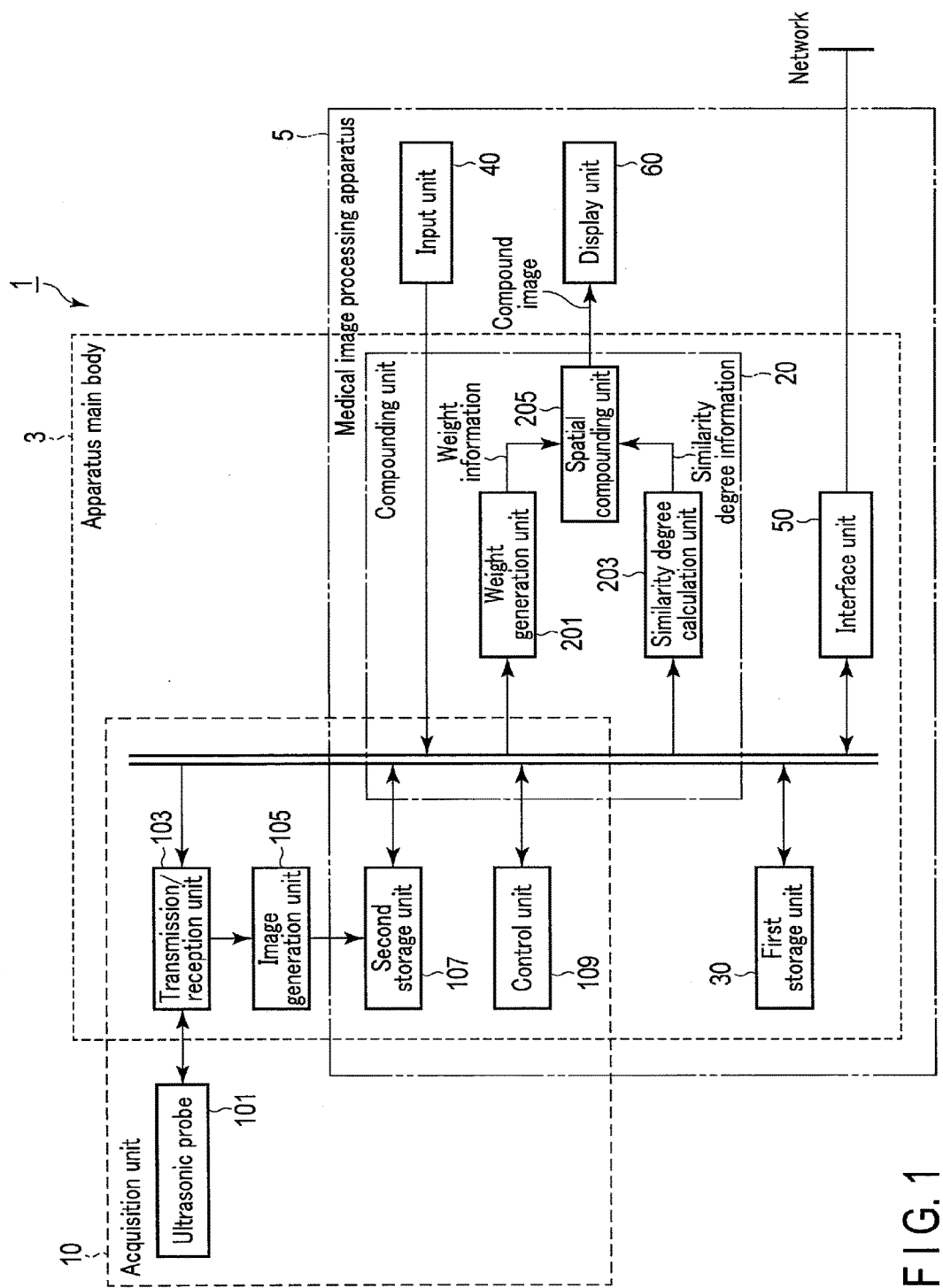
FIG. 1 is a block diagram showing the arrangement of an ultrasonic diagnostic apparatus 1 according to the first embodiment.

In general, according to one embodiment, a medical image processing apparatus includes storage circuitry and processing circuitry. The storage circuitry stores a plurality of images acquired by transmitting ultrasonic waves in different scanning parameters to a target region. The processing circuitry separates the pixel value of a pixel in the images into at least two components. The processing circuitry forms a compound image concerning to the images by using at least one of the components.

An ultrasonic diagnostic apparatus including a medical image processing apparatus according to this embodiment, a medical image processing method, and a medical image processing program will be described below with reference to the accompanying drawing. Note that the same reference numerals in the following description denote constituent elements having almost the same arrangements, and a repetitive description will be made only when required.

First Embodiment

FIG. 1 is a block diagram showing the arrangement of an ultrasonic diagnostic apparatus 1 according to the first embodiment. As shown in FIG. 1, the ultrasonic diagnostic apparatus 1 includes an apparatus main body 3, an input unit 40 connected to the apparatus main body 3 to input, to the apparatus main body 3, various types of instructions, commands, and information from the operator, an interface unit 50, a display unit 60, and an ultrasonic probe 101. The apparatus main body 3 includes a first storage unit 30, the interface unit 50, a transmission/reception unit 103, an image generation unit 105, a second storage unit 107, a control unit 109, a weight generation unit 201, a similarity degree calculation unit 203, and a spatial compounding unit 205. In addition, a biological signal measurement unit (not shown) typified by an electrocardiograph, phonocardiograph, sphygmograph, or respiration sensor and a network may be connected to the ultrasonic diagnostic apparatus 1 via the interface unit 50.

The ultrasonic diagnostic apparatus 1 includes, as functional units, an acquisition unit 10, a compounding unit 20, the first storage unit 30, the input unit 40, the interface unit 50, and the display unit 60. The acquisition unit 10 includes, for example, the ultrasonic probe 101, the transmission/reception unit 103, the image generation unit 105, the second storage unit 107, and the control unit 109. The compounding unit 20 includes, for example, the weight generation unit 201, the similarity degree calculation unit 203, and the spatial compounding unit 205. The ultrasonic diagnostic apparatus 1 performs image combining by using a plurality of ultrasonic images acquired by the acquisition unit 10. The ultrasonic diagnostic apparatus 1 then displays the formed compound image on the display unit 60 to provide the ultrasonic diagnostic image to a doctor or examination technician serving in a hospital.

The acquisition unit 10 acquires a plurality of ultrasonic images (tomographic images) by executing ultrasonic scanning on an object. More specifically, the acquisition unit 10 acquires a plurality of tomographic images respectively corresponding to a plurality of ultrasonic scans on the same slice at different steering angles, with the scans at least partly overlapping. Note that the acquisition unit 10 may include a plurality of units concerning processing from imaging to image generation. The respective units of the ultrasonic diagnostic apparatus 1 and a medical image processing apparatus 5 will be sequentially described below.

The ultrasonic probe 101 includes a plurality of piezoelectric transducers, a matching layer, and a backing member provided on the back surface side of the plurality of piezoelectric transducers. The plurality of piezoelectric transducers are acoustoelectric reversible conversion elements such as piezoelectric ceramic elements. The plurality of piezoelectric transducers are arranged in parallel and mounted on the distal end of the ultrasonic probe 101. Assume that in the following description, one piezoelectric transducer forms one channel.

Each piezoelectric transducer generates an ultrasonic wave in response to the driving signal supplied from the transmission/reception unit 103. When ultrasonic waves are transmitted to an object P via the ultrasonic probe 101, the transmitted ultrasonic waves (to be referred to as the transmitted ultrasonic waves hereinafter) are reflected by a discontinuity surface of acoustic impedance of a living body tissue in the object. The piezoelectric transducers receive the reflected ultrasonic waves and generate an echo signal. The amplitude of this echo signal depends on an acoustic impedance difference on the discontinuity surface as a boundary concerning the reflection of the ultrasonic waves. In addition, the frequency of the echo signal generated when transmitted ultrasonic waves are reflected by a moving blood flow, the surface of the cardiac wall, or the like is subjected to a frequency shift depending on the velocity component of the moving body (the blood flow and the surface of the cardiac wall) in the ultrasonic transmission direction due to the Doppler effect.

The matching layer is provided on the ultrasonic wave radiation surface side of the plurality of piezoelectric transducers to improve the efficiency of transmission/reception of ultrasonic waves to/from the object P. The backing member prevents ultrasonic waves from propagating backward from the piezoelectric transducers.

The ultrasonic probe 101 will be described below as a linear type probe which executes two-dimensional scanning with a one-dimensional array. Note that the ultrasonic probe 101 may be, for example, a convex type probe which executes two-dimensional scanning with a one-dimensional array, a sector type probe which executes two-dimensional scanning with a one-dimensional array, a mechanical four-dimensional probe which executes three-dimensional scanning by swinging a one-dimensional array in a direction perpendicular to the array direction of a plurality of transducers, or a two-dimensional array probe which executes two- or three-dimensional scanning with a two-dimensional array.

The transmission/reception unit 103 supplies a driving signal to each of the plurality of piezoelectric transducers of the ultrasonic probe 101 under the control of the CPU 109. The transmission/reception unit 103 generates a reception signal based on the received echo signal generated by each piezoelectric transducer. The transmission/reception unit 103 outputs the generated reception signal to the image generation unit 105.

More specifically, the transmission/reception unit 103 includes a pulse generator, transmission delay circuitry, pulser circuitry, a preamplifier, an analog to digital (to be referred to as A/D hereinafter) converter, reception delay circuitry, and an adder (none of which are shown).

The pulse generator repeatedly generates rate pulses for the formation of transmitted ultrasonic waves at a predetermined rate frequency fr Hz (period: 1/fr sec). The generated rate pulses are distributed to channel counts and sent to the transmission delay circuitry.

The transmission delay circuitry gives each rate pulse a delay time (to be referred to as a transmission delay time hereinafter) necessary to focus a transmitted ultrasonic wave into a beam and determine transmission directivity for each of the plurality of channels. The first storage unit 30 stores the transmission direction or transmission delay time (to be referred to as a transmission delay pattern hereinafter) of transmitted ultrasonic waves. The control unit 109 refers to the transmission delay pattern stored in the first storage unit 30 at the time of transmission of ultrasonic waves.

The pulser circuitry applies a voltage pulse (driving signal) to each of the piezoelectric transducers of the ultrasonic probe 101 at the timing based on this rate pulse. With this operation, an ultrasonic beam is transmitted to the object.

The preamplifier amplifies the echo signal received from the object P via the ultrasonic probe 101 for each channel. The A/D converter converts each amplified received echo signal into a digital signal.

The reception delay circuitry gives the received echo signals converted into the digital signals delay times (to be referred to as reception delay times hereinafter) required to determine reception directivity. The first storage unit 30 stores the reception direction or reception delay time of an echo signal (to be referred to as a reception delay pattern hereinafter). The control unit 109 refers to the reception delay pattern stored in the first storage unit 30 at the time of reception of ultrasonic waves.

The adder adds a plurality of echo signals given the delay times. With this addition, the transmission/reception unit 103 generates a reception signal (to be also referred to as an RF (radiofrequency) signal) with a reflection component from a direction corresponding to the reception directivity being enhanced. The transmission directivity and the reception directivity determine the comprehensive directivity of ultrasonic transmission/reception. This comprehensive directivity determines an ultrasonic beam (so-called "ultrasonic scanning line").

A plurality of ultrasonic scans (to be referred to as anisotropic scans hereinafter) executed on the same slice while a steering angle is changed, with the scans at least partly overlapping, will be described below. The steering angle is the angle defined between a straight line (to be referred to as a reference line hereinafter) which passes through the central point of the acoustic aperture of the ultrasonic probe 101 in contact with the body surface of an object and is perpendicular to the acoustic aperture plane and a straight line (to be referred to as a beam direction hereinafter) connecting the central point and the middle point of a line indicating the same depth of field in a scanned region.

For the sake of simplicity, assume that in the following description, a plurality of steering angles corresponding to anisotropic scans are set in advance. Note that a steering angle can be changed, e.g., adjusted or set, as needed, in accordance with an instruction from the operator. Beam directions are not limited to five directions like those shown in FIG. 2, and it is possible to perform scans in two or more directions.

Figure 2:
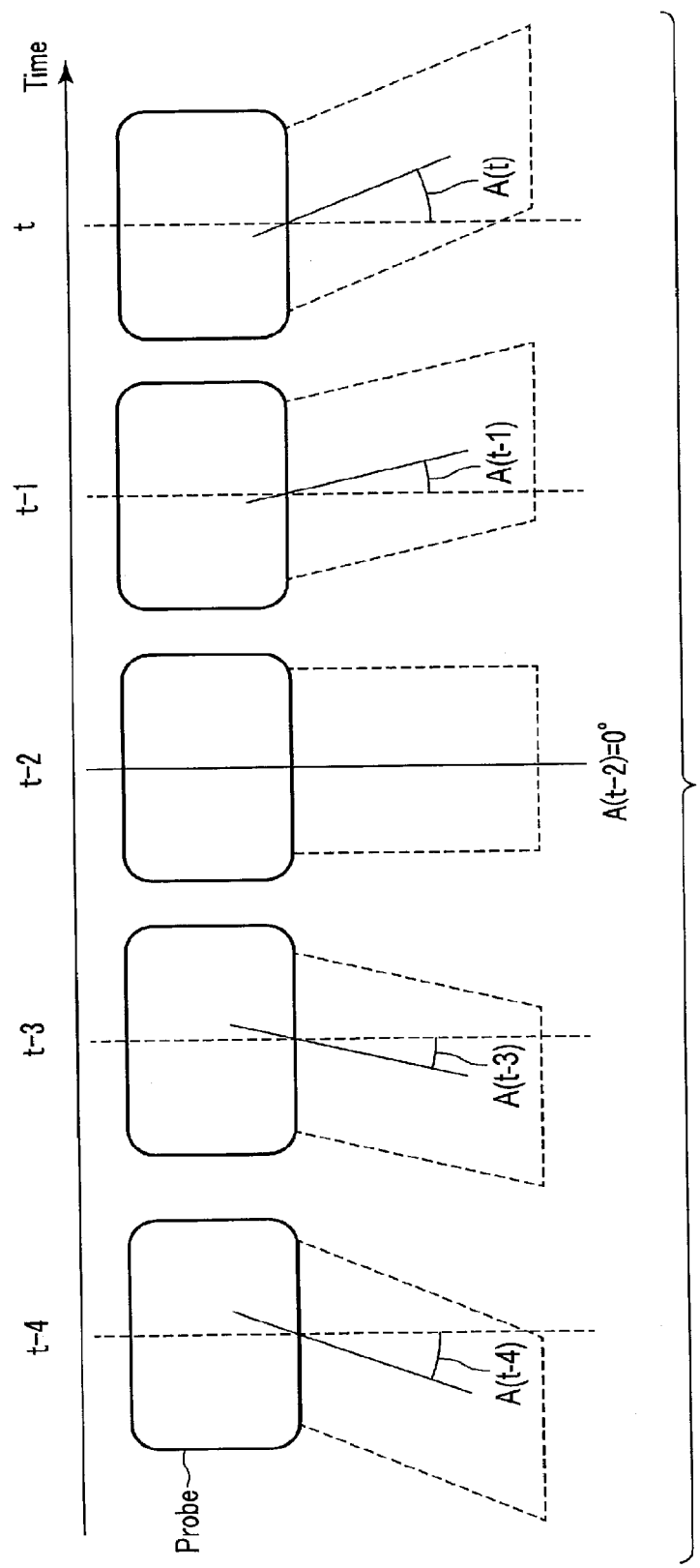
FIG. 2 is a view showing an example of a plurality of ultrasonic scans on the same slice at different steering angles, with the scans at least partly overlapping according to the first embodiment.

FIG. 2 is a view showing an example of a plurality of ultrasonic scans on the same slice at different steering angles, with the scans at least partly overlapping. FIG. 2 shows that five ultrasonic scans can be executed at steering angles respectively corresponding to five beam directions.

For example, a steering angle $A(t-2)$ at time $(t-2)$ in FIG. 2 is 0°. A steering angle $A(t)$ at time $(t)$ is larger than a steering angle $A(t-1)$ at time $(t-1)$ ($A(t-1)<A(t)$). The absolute value of a steering angle $A(t-3)$ at time $(t-3)$ is equal to the absolute value of the steering angle $A(t-1)$ at time $(t-1)$ ($|A(t-3)|=|A(t-1)|$). The absolute value of a steering angle $A(t-4)$ at time $(t-4)$ is equal to the absolute value of the steering angle $A(t)$ at time $(t)$ ($|A(t-4)|=|A(t)|$). When executing ultrasonic scans in five directions as shown in FIG. 2, the absolute values of steering angles in the five directions may differ from each other.

The transmission/reception unit 103 receives information concerning anisotropic scans (to be referred to as anisotropic scan information hereinafter) from the control unit 109. Anisotropic scan information includes, for example, the information of steering angles (beam directions) concerning anisotropic scans and transmission center frequency information, as the scanning parameters. The transmission/reception unit 103 applies driving signals for executing anisotropic scans to the piezoelectric transducers of the ultrasonic probe 101 based on anisotropic scan information. The transmission/reception unit 103 generates a reception signal based on the echo signal captured via the ultrasonic probe 101 in anisotropic scans.

Note that the transmission/reception unit 103 may generate a plurality of reception signals respectively corresponding to a plurality of beam directions by fixing beam directions concerning transmitted ultrasonic waves and changing a beam direction concerning the reception of ultrasonic waves by parallel simultaneous reception.

The image generation unit 105 forms a plurality of ultrasonic images (tomographic images) respectively corresponding to a plurality of steering angles (a plurality of beam directions) based on reception signals. The image generation unit 105 outputs the formed ultrasonic images to the second storage unit 107. More specifically, the image generation unit 105 includes a B-mode data generation device, a Doppler data generation device, a unit concerning the generation of other types of ultrasonic images (strain images, elastic images, and the like), and a digital scan converter (to be referred to as a DSC hereinafter). For the sake of simplicity, assume that the image generation unit 105 includes a B-mode data generation device, a Doppler data generation device, and a DSC.

The B-mode generation device includes an envelope detector and a logarithmic converter (neither of which is shown). The envelope detector executes envelope detection of the reception signal output from the transmission/reception unit 103. The envelope detector outputs the envelope-detected signal to the logarithmic converter (to be described later). The logarithmic converter relatively enhances a weak signal by logarithmically converting the envelope-detected signal. The B-mode generation device generates a signal value (B-mode data) for each depth on each scanning line based on the signal enhanced by the logarithmic converter.

The B-mode generation device generates two-dimensional B-mode data based on a plurality of signal values respectively arranged in the azimuth direction and the depth direction (range direction) in a scanned region. The range direction is the depth direction on a scanning line. The azimuth direction is, for example, an electronic scanning direction along the array direction of one-dimensional ultrasonic transducers. Note that when a scanned region is a three-dimensional region, the B-mode data generation unit may generate three-dimensional B-mode data based on a plurality of signal values respectively arranged in the azimuth direction, the depth direction, and the elevation direction based on outputs from the transmission/reception unit 103. The elevation direction is the mechanical swinging direction of the one-dimensional ultrasonic transducers.

The Doppler generation device includes a mixer, a low pass filter (to be referred to an LPF hereinafter), and a velocity/variance/power computation device (none of which are shown). The mixer multiplies the reception signal output from the transmission/reception unit 103 by a reference signal having a frequency $f_0$ equal to the transmission frequency. This multiplication obtains a signal having a component with a Doppler shift frequency $f_d$ and a signal having a frequency component of $(2f_0+f_d)$. The LPF removes a signal of a high-frequency component $(2f_0+f_d)$ from a signal having two types of frequency components from the mixer. The Doppler generation device generates a Doppler signal having the component with the Doppler shift frequency $f_d$ by removing the signal of the high-frequency component $(2f_0+f_d)$.

Note that the Doppler generation device may use a quadrature detection scheme to generate Doppler signals. In this case, the Doppler generation device performs quadrature detection to convert a reception signal (RF signal) into an IQ signal. The Doppler data generation device generates a Doppler signal having the Doppler shift frequency $f_d$ by performing complex Fourier transform on the IQ signal. Doppler signals are, for example, Doppler components based on a blood flow, tissue, and contrast medium.

The velocity/variance/power computation device includes an MTI (Moving Target Indicator) filter, an LPF filter, and an autocorrelation computation device (none of which are shown). Note that this device may include a cross-correlation computation device instead of the autocorrelation computation device. The MTI filter removes a Doppler component (a clutter component) caused by the respiratory movement or pulsatory movement of an organ or the like from a generated Doppler signal. The MTI filter is used to extract a Doppler component (to be referred to as a blood flow Doppler component hereinafter) concerning a blood flow from a Doppler signal. The LPF is used to extract a Doppler component (to be referred to as a tissue Doppler component hereinafter) concerning the movement of the tissue from a Doppler signal.

The autocorrelation computation device calculates autocorrelation values concerning a blood flow Doppler signal and a tissue Doppler component. The autocorrelation computation device calculates the average velocity values of the blood flow and the tissue, variances, the reflection intensities (powers) of Doppler signals, and the like based on the calculated autocorrelation values. The velocity/variance/power computation device generates color Doppler data at the respective positions in a predetermined region based on the average velocity values of the blood flow and the tissue, the variances, the reflection intensities of the Doppler signals, and the like based on a plurality of Doppler signals. Doppler signals and color Doppler data will be collectively referred to as Doppler data hereinafter.

Note that the image generation unit 105 may include a three-dimensional image processing device. In this case, the three-dimensional image processing device generates two-dimensional display image data by performing three-dimensional image processing for three-dimensional B-mode image data. The three-dimensional image processing device executes, as three-dimensional image processing, for example, volume rendering by a ray casting method, surface rendering, maximum intensity projection (to be referred to as MIP hereinafter), or multi-planar reconstruction.

The DSC forms a B-mode image by converting B-mode data into a scanning line signal string in a general video format typified by a TV format. The DSC forms a Doppler image by converting Doppler data into a scanning line signal string in a general video format typified by a TV format. Note that the DSC may form a B-mode image as a projection image by converting the two-dimensional display image data generated by using three-dimensional image processing into a scanning line signal string in a general video format typified by a TV format. B-mode images and Doppler images will be collectively referred to as ultrasonic images hereinafter. The DSC outputs an ultrasonic image to the second storage unit 107.

The second storage unit 107 stores ultrasonic images respectively corresponding to the steering angles (the scanning parameters) in association with the anisotropic scan information output from the control unit 109. For example, the second storage unit 107 temporarily stores ultrasonic images in association with beam direction information and transmission center frequency information. The second storage unit 107 outputs the plurality of temporarily stored ultrasonic images, together with the corresponding anisotropic scan information, to the compounding unit 20 in response to the end of anisotropic scans (for example, the end of the scans in the five directions in FIG. 2). Note that the plurality of ultrasonic images may be output to the compounding unit 20 while being stored in the second storage unit 107 in association with the anisotropic scans.

The compounding unit 20 forms one compound image by combining a plurality of ultrasonic images output from the second storage unit 107. That is, in this embodiment, a plurality of ultrasonic images acquired while a beam direction is changed are combined and output. More specifically, the compounding unit 20 outputs the formed compound image to the display unit 60. The compound image output to the display unit 60 is displayed on the monitor of the display unit 60 or the like. At this time, the compound image may be held in the second storage unit separately provided in the display unit 60. The compounding method will be described in detail later.

The detailed operation of the compounding unit 20 will be described below.

The weight generation unit 201 generates weight information to be assigned for each pixel and each beam direction by using luminance information (pixel value information) of a pixel block (to be referred to as the first region hereinafter) containing a plurality of pixels around each pixel in the data of a plurality of ultrasonic images obtained while a beam direction is changed. That is, the weight generation unit 201 generates weight information for each pixel and each steering angle based on a plurality of pixel values in the first region including each of a plurality of pixels in each of a plurality of ultrasonic images respectively corresponding to a plurality of steering angles. Detailed information about the weight generation unit 201 will be described later.

The similarity degree calculation unit 203 generates similarity degree information by calculating a similarity degree for each pixel at the same position on each of a plurality of ultrasonic images respectively corresponding to a plurality of beam directions. That is, the similarity degree calculation unit 203 calculates a similarity degree for each pixel based on the pixel values of a plurality of ultrasonic images with different steering angles. The similarity degree calculation unit 203 outputs the similarity degree information to the spatial compounding unit 205.

In overlapped regions concerning a plurality of ultrasonic images with different steering angles, a region corresponding to a body tissue appears at the same position. However, the position, shape, and size of an artifact or noise in each overlapped region depend on a beam direction (steering angle). Using similarity degree information, therefore, can identify a body tissue, artifact, and noise in an overlapped region in each ultrasonic image.

If, for example, the number of beam directions is three or more, that is, there are three or more different steering angles, the similarity degree calculation unit 203 calculates a similarity degree by selecting two proper directions. Note that if the number of beam directions is three or more, the similarity degree calculation unit 203 may calculate a plurality of similarity degrees from all combinations in two directions and generate one piece of similarity degree information by combining the similarity degrees.

That is, if, for example, there are three different beam directions, namely, beam directions A, B, and C, an ultrasonic image Ai corresponding to beam direction A, an ultrasonic image Bi corresponding to beam direction B, and an ultrasonic image Ci corresponding to beam direction C are generated by anisotropic scans. In this case, the similarity degree calculation unit 203 calculates a first similarity degree S1 based on the ultrasonic image Ai and the ultrasonic image Bi. In addition, the similarity degree calculation unit 203 calculates a second similarity degree S2 based on the ultrasonic image Bi and the ultrasonic image Ci. In addition, the similarity degree calculation unit 203 calculates a third similarity degree S3 based on the ultrasonic image Ci and the ultrasonic image Ai. The similarity degree calculation unit 203 calculates one piece of similarity degree information by combining the first similarity degree S1, the second similarity degree S2, and the third similarity degree S3. In this case, "combining" includes various types of averaging and adding such as arithmetic averaging and geometric averaging of similarity degrees.

A similarity degree $R_{ij}$ at a pixel (i, j) is calculated by using, for example, the following equation concerning normalization cross-correlation.

$$R_{ij} = \frac{\sum_{q=j-N/2}^{j+N/2}\sum_{p=i-M/2}^{i+M/2}((I(p,q)-\bar{I})(T(p,q)-\bar{T}))}{\sqrt{\sum_{q=j-N/2}^{j+N/2}\sum_{p=i-M/2}^{i+M/2}(I(p,q)-\bar{I})^2 \times \sum_{q=j-N/2}^{j+N/2}\sum_{p=i-M/2}^{i+M/2}(T(p,q)-\bar{T})^2}}$$

In the above equation, i represents, for example, the row number of a pixel on an ultrasonic image, j represents the column umber of a pixel on an ultrasonic image, I(p, q) represents the pixel value of a position (p, q) on image I, T(p, q) represents the pixel value of the position (p, q) on image T, M corresponds to an even number for defining the number of pixels on a row (to be referred to as a row count hereinafter) in a region (to be referred to as the second region hereinafter) concerning the calculation of a similarity degree centered on the pixel (i, j) on images I and T, and N corresponds to an even number for defining the number of pixels on a column (to be referred to as a column count hereinafter) in the second region on images I and T. That is, a similarity degree concerning the pixel (i, j) is calculated by using pixel values in the second region defined by the row count M and the column count N centered on a position (i, j) of the pixel. The second region is the rectangular region defined by M×N.

Note that if a partial region of the second region is not included in a pixel value region (to be referred to as an image region hereinafter) on image I or T, a similarity degree is calculated in a region corresponding to the overlapped portion between the image region and the second region. That is, if a partial region of the second region protrudes from the image region, since no pixel values of images I and T exist in the partial region, the sum range (the upper or lower limit) in above equation is limited to the overlapped region between the image region and the partial region of the second region.

$\bar{I}$ represents the average pixel value obtained by dividing the sum of all pixel values on image I by the total number of pixels.

$\bar{T}$ represents the average pixel value obtained by dividing the sum of all pixel values on image T by the total number of pixels.

Assume that a similarity degree $R_{ij}$ concerning the pixel (i, j) takes a value of 0.0 to 1.0. Note that if the calculation result on the similarity degree $R_{ij}$ is 0.0 or less, that is, 0 or a negative value, the value of the similarity degree $R_{ij}$ is clipped to 0. Note that the similarity degree $R_{ij}$ concerning the pixel (i, j) is not limited to the above equation and may be obtained by using an arbitrary similarity degree calculation method. In addition, for example, in order to increase processing speed, similarity degrees concerning all the pixels may be fixed to 1.0.

The weight generation unit 201 generates weight information for each pixel of each ultrasonic image based on a plurality of pixel values in the first region including a pixel on each of a plurality of ultrasonic images respectively corresponding to a plurality of beam directions. The weight generation unit 201 outputs the generated weight information to the spatial compounding unit 205.

More specifically, the weight generation unit 201 scans the data of each of a plurality of ultrasonic images respectively corresponding to a plurality of beam directions to decide weight distributions corresponding to the plurality of beam directions for each pixel (each target pixel, i.e., the pixel (i, j) described above). It is possible to perform the above scans in a raster scan order. The weight generation unit 201 generates a weight distribution for each target pixel by using a plurality of pixel values in the first region having a plurality of pixels around the target pixel. Note that luminance values may be used instead of pixel values.

Figure 3:
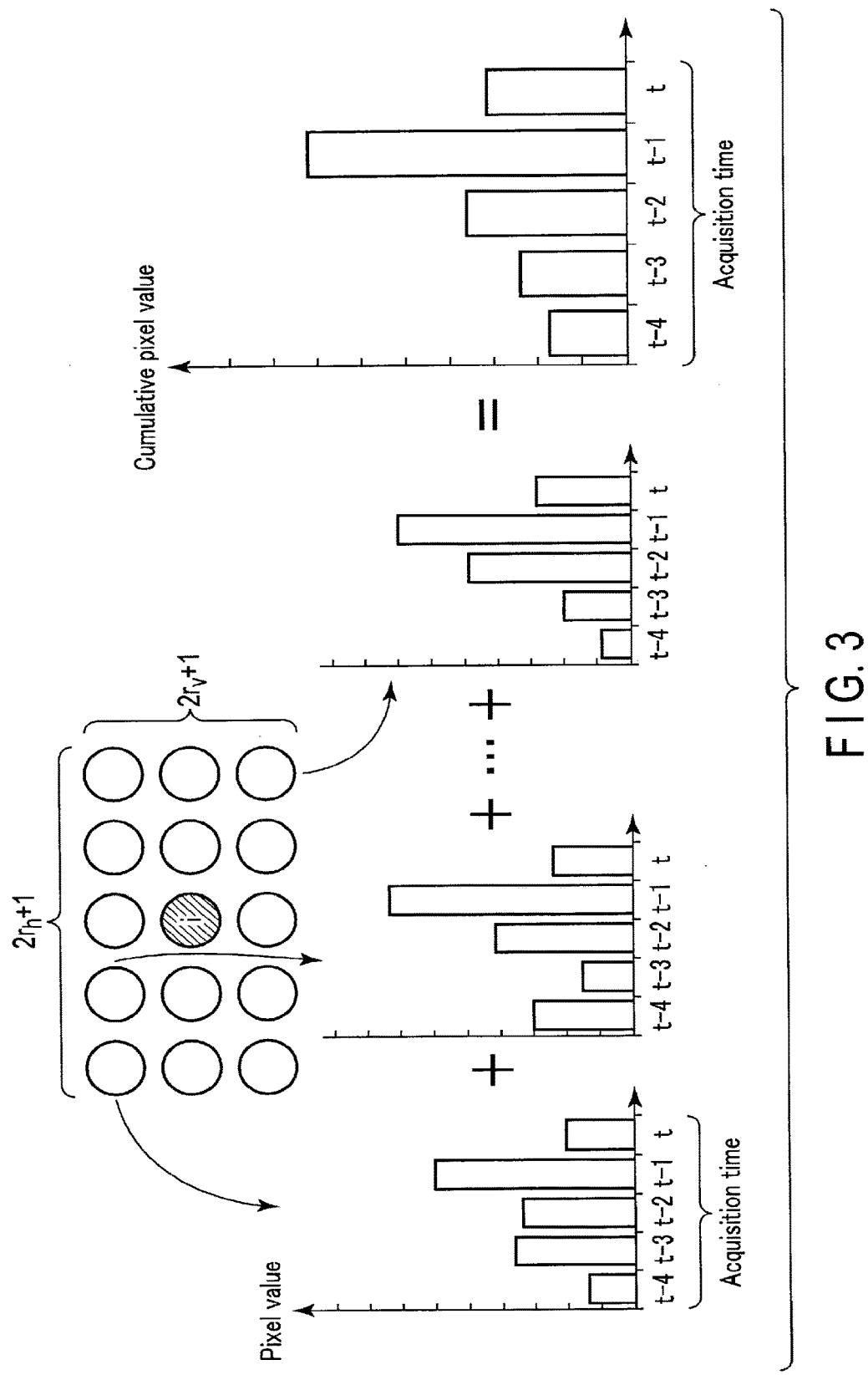
FIG. 3 is a view showing an example of the generation of weights according to the first embodiment.

FIG. 3 a view showing an example of the generation of weights. Referring to FIG. 3, when a pixel i is a target pixel, a rectangular region having a size of $(2r_h+1)\times(2r_v+1)$ centered on the pixel i represents the first region. In the first region, pixel values on a plurality of ultrasonic images respectively corresponding to a plurality of beam directions are accumulated for each of the plurality of beam directions, i.e., each acquisition time. The distribution of cumulative values of pixel values (to be referred to as cumulative pixel values hereinafter) at each acquisition time will be referred to as a cumulative distribution. Referring to FIG. 3, $r_h$ and $r_v$ are natural numbers equal to or more than 1 and set in advance. In the case shown in FIG. 3, $r_h$ and $r_v$ are 2 and 1, respectively. When an observed pixel value (luminance value) of the pixel i in ultrasonic image data at given acquisition time t is defined as v(t, i), a height (magnitude) h(t−k, i) of a bin (cumulative pixel value) of the cumulative distribution which corresponds to time (t−k) is calculated by $$h(t-k, i) = \sum_{j\in\Omega(i)} v(t-k, j)$$

In the above equation, Ω(i) represents the first region $(2r_h+1)\times(2r_v+1)$, and j represents a plurality of pixels included in the first region Ω(i) centered on the pixel i. Note that if a partial region of the first region is not included in the image region of each ultrasonic image, weight information is generated by using pixel values in a region corresponding to the overlapped portion between the image region and the first region. That is, if a partial region of the first region protrudes from the image region, since no pixel value of the ultrasonic image corresponding to the partial region exists, the sum range Ω(i) in the above equation is limited to the overlapped region between the image region and the first partial region.

Note that the first region (Ω(i)) and the second region (M×N) may or may not have the same size.

The weight generation unit 201 generates a weight w(t, i) of the pixel i as a weight in each of a plurality of beam directions by using the height h(t−k, i) of a bin of the obtained cumulative distribution according to the following equation.

$$w(t, i) = \frac{1}{Z}h(t, i)$$

In the above equation, Z is a constant which is defined by the following equation and normalizes the total sum of the weights w(t, i) to 1.

$$Z = \sum_{k=0}^{n} h(t-k, i)$$

In the above equation, k is a natural number corresponding to the acquisition time or a past acquisition number, and n is a natural number corresponding to the number of beam directions or the maximum value of past acquisition numbers. For example, referring to FIG. 3, n is 4. The weights described above can suppress the influence of random noise on each of a plurality of ultrasonic images respectively corresponding to a plurality of beam directions. In addition, when a similarity degree is high, a large weight can be given to a pixel having a large pixel value (luminance value).

On the other hand, in order to give a large weight to a pixel having a small pixel value (luminance value), the weight generation unit 201 generates an reverse weight w'(t, i) with respect to each pixel according to, for example, the following equation to take the reverse value of the weight w(t, i).

$$w'(t, i) = \frac{1}{Z'}(1.0 - w(t, i))$$

where Z' is a constant which is defined by the following equation and normalizes the total sum of the reverse weights w'(t, i) to 1.

$$Z' = \sum_{k=0}^{n} (1.0 - w(k, i))$$

FIG. 4 is a graph concerning the reverse weights w'(t, i). The weight generation unit 201 calculates the reverse weight w'(t, i) by normalizing the weight w(t, i) by subtracting it from 1. As shown in FIG. 4, the reverse weight w'(t, i) is reverse to the weight w(t, i). The weight generation unit 201 generates the weight w(t, i) and the reverse weight w'(t, i) as weight information. The weight generation unit 201 outputs the weight information to the spatial compounding unit 205.

The spatial compounding unit 205 combines a plurality of ultrasonic images with different steering angles by using similarity degree information and weight information. That is, the spatial compounding unit 205 forms one compound image by combining a plurality of ultrasonic images respectively corresponding to a plurality of beam directions using the similarity degree information and the weight information. The spatial compounding unit 205 outputs the compound image to the display unit 60.

More specifically, the spatial compounding unit 205 combines pixel values for each pixel i on each of a plurality of ultrasonic images by using the weight w(t, the reverse weight w'(t, i), and a similarity degree $R_i$. The spatial compounding unit 205 calculates a pixel value $v_{out}(t, i)$ of the pixel i after combining by, for example, the following equation. The pixel i corresponds to the position (i, j) of the pixel, and $R_i$ corresponding to $R_{ij}$.

$$v_{out}(t, i) = R_i \times \sum_{k=0}^{n} w(t-k, i)v(t-k, i) + (1.0 - R_i) \times \sum_{k=0}^{n} w'(t-k, i)v(t-k, i)$$

The reason why the first embodiment can clearly depict a tissue while suppressing the influence of random noise will be described below. A body tissue is displayed with large pixel values when ultrasonic waves vertically strike and are reflected by the body tissue. Therefore, it is highly possible to display a tissue with high luminance by combining a plurality of ultrasonic image data with different beam directions (different steering angles) using large pixel values.

However, ultrasonic image data includes a lot of random noise, and sometimes takes a large pixel value by accident in a region where no body tissue as a reflector exists. In this case, simply collecting only large pixel values and compounding them will also combine noise. As a result, the body tissue is embedded in random noise, leading to a deterioration in visibility.

The first embodiment, therefore, obtains a statistical cumulative distribution in a local block having a given size (the first region Ω(i)). Random noise with average 0 is superimposed on a signal and observed. Therefore, when a plurality of samples (a plurality of pixels included in the first region) are collected and averaged, the resultant value converges to 0. On the other hand, a body tissue rarely exists on a single pixel and generally exists over a plurality of pixels. For this reason, it is thought that when pixel values are averaged near a local, neighboring pixels take large pixel values at the same time in a region where a body tissue exists.

As accumulating pixel values in a local block, therefore, pixel values taking large values owing to the presence of the body tissue are expected to be more dominant than pixel values which increase owing to random noise. That is, it is thought that the height of each bin of a cumulative distribution has a high correlation with a probability value statistically representing in which direction a beam can depict the tissue. It is possible to clearly depict a body tissue while suppressing the influence of random noise by combining ultrasonic image data in each of a plurality of beam directions using the heights of this cumulative distribution as weights. In addition, adding similarity degree information makes it possible to identify artifacts and noise over a region larger than the rectangular region (the first region Ω(i)). Furthermore, using weight information corresponding to similarity degrees can suppress large artifacts and noise while enhancing the body tissue.

The first storage unit 30 stores anisotropic scan information such as a plurality of reception delay patterns with different steering angles (beam directions) and different focus depths and a plurality of transmission delay patterns with different steering angles (beam directions). The first storage unit 30 stores algorithms (a weight generation algorithm and a similarity degree generation algorithm) concerning the generation of weight information and similarity degree information and various types of computational expressions used by the weight generation algorithm and the similarity degree generation algorithm.

In addition, the first storage unit 30 stores an algorithm (spatial compounding algorithm) for combining a plurality of ultrasonic images respectively corresponding to a plurality of beam directions by using weight information and similarity degree information and various types of computational expressions used by the combining algorithm. The first storage unit 30 stores control programs for the ultrasonic diagnostic apparatus 1, a diagnosis protocol, various types of data groups such as transmission/reception conditions (scanning parameters), diagnosis information (patient IDs, findings by doctors, and the like), the reception signals generated by the transmission/reception unit 103, and the ultrasonic images generated by the image generation unit 105.

The input unit 40 inputs, to the apparatus main body 3, various types of instruction, commands, information, selections, and settings from the operator. The input unit 40 includes input devices such as a trackball, switch buttons, a mouse, and a keyboard (none of which are shown). The input device detects the coordinates of the cursor displayed on the display screen and outputs the detected coordinates to the control unit 109. Note that the input device may be a touch command screen provided to cover the display screen. In this case, the input unit 40 detects touched and designated coordinates by a coordinate reading principle such as an electromagnetic induction scheme, magnetostriction scheme, or a pressure-sensitive scheme, and outputs the detected coordinates to the control unit 109. When, for example, the operator operates the end button of the input unit 40, the ultrasonic transmission/reception is terminated, and the apparatus main body 3 is set in a pause state.

The interface unit 50 is an interface associated with a network, an external storage device (not shown), and a biological signal measurement unit. Data such as the ultrasonic images, the analysis results, and the like, which are obtained by the apparatus main body 3, can be transferred to other apparatuses via the interface unit 50 and the network. Note that the interface unit 50 can also download, via the network, medical images concerning objects acquired by other medical image diagnostic apparatuses (not shown).

The display unit 60 displays a compound image or the like based on an output from the spatial compounding unit 205. Note that the display unit 60 may execute adjustment such as brightness correction, contrast correction, dynamic range correction, and γ correction and color mapping with respect to a displayed image.

The control unit 109 reads out the transmission delay pattern, the reception delay pattern, and the apparatus control program stored in the first storage unit 30 based on selection between the B mode and the Doppler mode, the frame rate, the scan depth, and transmission start/end which are input by the operator via the input unit 40, and controls the apparatus main body 3 in accordance with the readout information.

Upon receiving, for example, an instruction concerning the start of anisotropic scanning (to be referred to as an anisotropic scan start instruction hereinafter) via the input unit 40, the control unit 109 reads out anisotropic scan information from the first storage unit 30. The control unit 109 controls the transmission/reception unit 103 based on the readout anisotropic scan information. At this time, the control unit 109 reads out the weight generation algorithm and various types of computational expressions from the first storage unit 30. The control unit 109 controls the weight generation unit 201 by using the readout weight generation algorithm and various types of computational expressions. Weight information is generated by controlling the weight generation unit 201.

In addition, upon receiving an anisotropic scan start instruction via the input unit 40, the control unit 109 reads out the similarity degree generation algorithm and various types of computational expressions from the first storage unit 30. The control unit 109 controls the similarity degree calculation unit 203 by using the readout similarity degree generation algorithm and various types of computational expressions. Similarity degree information is generated by controlling the similarity degree calculation unit 203.

Furthermore, upon receiving an anisotropic scan start instruction via the input unit 40, the control unit 109 reads out the spatial compounding algorithm and various types of computational expressions from the first storage unit 30. The control unit 109 controls the spatial compounding unit 205 by using the readout spatial compounding algorithm and various types of computational expressions. A compound image is formed by controlling the spatial compounding unit 205.

(Spatial Compounding Function)

A spatial compounding function is a function of combining a plurality of ultrasonic images generated by anisotropic scans. Processing concerning the spatial compounding function (to be referred to as spatial compounding processing hereinafter) will be described below.

Figure 5:
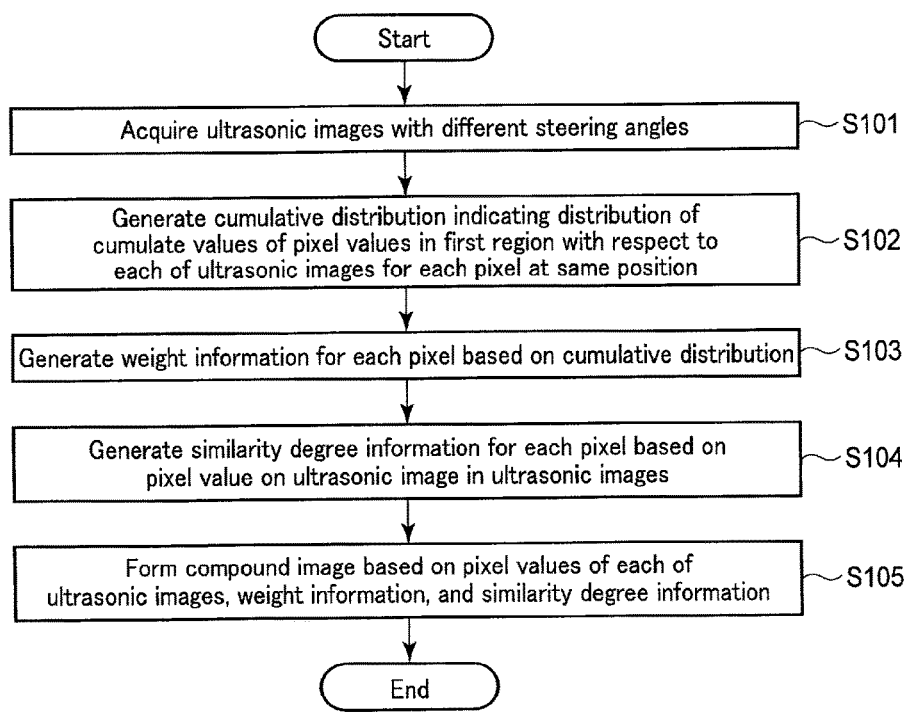
FIG. 5 is a flowchart showing an example of a procedure for spatial compounding processing according to the first embodiment.

FIG. 5 is a flowchart showing a procedure for spatial compounding processing.

A plurality of ultrasonic images with different steering angles (beam directions) are acquired (step S101). When the medical image processing apparatus 5 is to execute this function, the apparatus acquires a plurality of ultrasonic images with different steering angles (beam directions) from an ultrasonic diagnostic apparatus, medical image archiving apparatus, or the like via the interface unit 50 (or the acquisition unit 10), and stores them in the second storage unit 107 of the acquisition unit 10. The data of these ultrasonic images is the data of two or more images obtained while a beam direction was changed, and is used, for example, for the generation of weight information, similarity degree information, and a compound image.

A cumulative distribution in a pixel block (the first region $\Omega(i)$) including surrounding pixels for each pixel is generated by using the image data acquired in step S101 (step S102). That is, a cumulative distribution indicating the distribution of the cumulative values of a plurality of pixel values in the first region is generated for each pixel at the same position with respect to each of a plurality of ultrasonic images. Weight information to be assigned to each beam direction and each pixel is generated based on the height of a bin of the cumulative distribution generated for each pixel (step S103).

Similarity degree information is generated by calculating a similarity degree from image data in each of a plurality of beam directions (step S104). That is, similarity degree information concerning each pixel of a plurality of ultrasonic images is generated based on pixel values on the ultrasonic images.

A compound image is formed by weighted averaging of image data in the respective directions using the generated weight information and similarity degree information (step S105).

According to the above arrangement, the following effects can be obtained.

The ultrasonic diagnostic apparatus 1 according to this embodiment can generate, for a plurality of pixels on a plurality of ultrasonic images generated based on anisotropic scans, weight information based on a plurality of pixel values corresponding to a plurality of pixels included in the first region and similarity degree information based on a plurality of pixel values corresponding to a plurality of pixels included in the second region. In addition, the ultrasonic diagnostic apparatus 1 can form a compound image based on a plurality of pixel values on a plurality of ultrasonic images generated based on anisotropic scans, weight information, and similarity degree information.

With this operation, the ultrasonic diagnostic apparatus 1 can display a compound image clearly drawing a body tissue while suppressing the influence of random noise and reducing artifacts and noise over a region larger than a rectangular region (the first region $\Omega(i)$).

In addition, the ultrasonic diagnostic apparatus 1 according to this embodiment has the following effects by using reverse weights in weighting operation. When a similarity degree at a target pixel is low, it is highly possible that noise is mixed in the target pixel. For this reason, large weights are assigned to small pixel values of a plurality of pixel values concerning the target pixel. That is, using reverse weights can reduce the influence of noise on the target pixel on a compound image.

As described above, the ultrasonic diagnostic apparatus 1 can display an ultrasonic image with improved body tissue drawing performance while suppressing noise.

When the technical idea of the ultrasonic diagnostic apparatus 1 is to be implemented in the medical image processing apparatus 5 as a modification of the above embodiment, the apparatus includes, for example, constituent elements within the two-dot dashed line in the block diagram of FIG. 1. In this case, a plurality of processes concerning spatial compounding processing is the same as those in the first embodiment.

Second Embodiment

The following three points differ from the first embodiment. An ultrasonic diagnostic apparatus 1 according to the second embodiment generates a plurality of ultrasonic images respectively corresponding to a plurality of transmission center frequencies (the scanning parameters) by performing ultrasonic scans on the same slice with the plurality of transmission center frequencies while fixing a steering angle. The ultrasonic diagnostic apparatus 1 then decomposes a plurality of pixel values corresponding to a plurality of pixels on each ultrasonic image into global components indicating a rough structure (to be referred to as a global structure hereinafter) of the image and local components indicating a fine structure (to be referred to as a local structure hereinafter) of the image. In addition, the ultrasonic diagnostic apparatus 1 forms a compound image by combining global components and local components corresponding to different transmission center frequencies.

FIG. 6 is a block diagram showing an example of the arrangement of the second embodiment. The second embodiment is configured to combine the data of a plurality of ultrasonic images obtained by controlling frequency bands concerning transmission center frequencies and output the resultant data. The arrangements of an acquisition unit 10 and a display unit 60 are the same as those in the first embodiment. The data of ultrasonic images input from the acquisition unit 10 to a compounding unit 20 are the data of a plurality of ultrasonic images respectively corresponding to a plurality of transmission center frequencies in two or more frequency bands set in advance.

A difference in arrangement from the first embodiment resides in the constituent elements included in the compounding unit 20. More specifically, the compounding unit 20 includes a component decomposition unit 207, an enhancing unit 209, and a frequency compounding unit 211. A first storage unit 30 stores information (to be referred to as frequency-difference scan information hereinafter) concerning scans with different transmission center frequencies (to be referred to as frequency-difference scans hereinafter). Frequency-difference scan information includes, for example, a plurality of different transmission center frequencies corresponding to ultrasonic scans, frequency bands concerning a plurality of transmission frequencies, and a plurality of transmission delay patterns respectively corresponding to the plurality of transmission frequencies, as scanning parameters.

In addition, the first storage unit 30 stores a decomposition algorithm for decomposing the pixel value of each of a plurality of pixels on an ultrasonic image into a global component and a local component and various types of computational expressions concerning the decomposition algorithm. Note that each pixel value may be separated into multiple components. The first storage unit 30 stores an algorithm (frequency compounding algorithm) for combining global components and local components respectively corresponding to a plurality of transmission frequencies at different transmission frequencies. The first storage unit 30 also stores an enhancing algorithm for enhancing local components and various types of filters (e.g., an edge detection filter) used by the enhancing algorithm.

Upon receiving, for example, an instruction concerning the start of frequency-difference scanning (to be referred to as a frequency-difference scan start instruction hereinafter) via an input unit 40, a control unit 109 reads out frequency-difference scan information from the first storage unit 30. The control unit 109 controls a transmission/reception unit 103 based on the frequency-difference scan information and the like. At this time, the control unit 109 reads out the decomposition algorithm and various types of computational expressions concerning the decomposition algorithm from the first storage unit 30. The control unit 109 controls the component decomposition unit 207 by using the readout decomposition algorithm and various types of computational expressions. Global components and local components are formed for each ultrasonic image by controlling the component decomposition unit 207.

In addition, upon receiving a frequency-difference scan start instruction via the input unit 40, the control unit 109 reads out the enhancing algorithm and various types of filters from the first storage unit 30. The control unit 109 controls the enhancing unit 209 by using the readout enhancing algorithm and filters. Enhanced local components are formed by enhancing the local components by controlling the enhancing unit 209.

Furthermore, upon receiving a frequency-difference scan start instruction via the input unit 40, the control unit 109 reads out the frequency compounding algorithm from the first storage unit 30. The control unit 109 controls the frequency compounding unit 211 in accordance with the readout frequency compounding algorithm. A compound image is formed by controlling the frequency compounding unit 211.

The component decomposition unit 207 decomposes the data of a plurality of ultrasonic images in different frequency bands which are obtained by the acquisition unit 10 into global components indicating a global structure and local components indicating a local structure. Global components are also called DC components. Local components are also called AC components. More specifically, the component decomposition unit 207 decomposes a pixel value $v(t, i)$ of a pixel $i$ on an ultrasonic image acquired at time $t$ into a global component S(t, i) and a local component L(t, i) by using the following equation.

$$v(t,i)=S(t,i)+L(t,i)$$

More specifically, first of all, the component decomposition unit 207 calculates a global component with respect to the pixel i by using the following equation.

$$S(t, i) = \frac{1}{(2r_b + 1)^2} \sum_{j \in \Psi(i)} v(t, j)$$

In the above equation, ψ(i) represents a region (to be referred to as the third region hereinafter) concerning the calculation of a global component concerning the pixel i. The third region ψ(i) is a rectangular block centered on the pixel i and having boundaries at positions separated by $r_b$ in the row and column directions. That is, since the number of pixels included in the third region ψ(i) is $(2r_b+1) \times (2r_b+1) = (2r_b+1)^2$. As is obvious from the above equation, a global component corresponds to the average value of a plurality of pixel values respectively corresponding to a plurality of pixels included in the third region ψ(i) centered on the pixel i.

Note that when a partial region of the third region is not included in the image region of an ultrasonic image, global components are calculated in a region corresponding to the overlapped portion between the image region and the third region. That is, when a partial region of the third region protrudes from the image region, since no pixel values of the ultrasonic image exist in the partial region, the sum range ψ(i) and the denominator $(2r_b+1)^2$ in the above equation are limited to the overlapped region between the image region and the third partial region.

The component decomposition unit 207 then calculates a local component L(t, i) corresponding to the pixel i by using the following equation.

$$L(t,i)=v(t,i)-S(t,i)$$

As indicated by the above equation, the local component L(t, i) corresponding to the pixel i is calculated by subtracting the global component S(t, i) from the pixel value v(t, i) corresponding to the pixel i.

The second embodiment is configured to decompose an ultrasonic image into global components and local components by using the component decomposition unit 207, correct each component, and combine the components again by using the frequency compounding unit 211, thereby improving the visibility of a body tissue. The component decomposition unit 207 may selectively switch the following methods for each component, pixel, or region.

<Component Setting Method 1: Selection Scheme>

The component decomposition unit 207 selects one global component and a local component with a transmission center frequency different from that of the global component from the data of a plurality of ultrasonic images obtained with different transmission center frequencies. A global component selection method selects, as a global component, for example, a component corresponding to a transmission center frequency at which noise is low or a preset transmission center frequency. A local component selection method selects, as a local component, for example, a component corresponding to a transmission center frequency at which the continuity of a body tissue is high or a preset transmission center frequency. The component decomposition unit 207 outputs the selected local component to the enhancing unit 209. The component decomposition unit 207 outputs the selected global component to the enhancing unit 209 and the frequency compounding unit 211.

When selecting a global component, a transmission center frequency at which noise is low or a preset transmission center frequency is, for example, the highest transmission center frequency among a plurality of transmission center frequencies. In addition, when selecting a local component, a transmission center frequency at which the continuity of a body tissue is high or a preset transmission center frequency is, for example, the lowest transmission center frequency among a plurality of transmission center frequencies.

<Component Setting Method 2: Compounding Scheme>

The component decomposition unit 207 forms a new global component (to be referred to as a weighted averaging global component hereinafter) by executing weighted averaging with respect to a plurality of global components respectively corresponding to a plurality of transmission center frequencies. The component decomposition unit 207 forms a new local component (to be referred to as weighted averaging local component hereinafter) by executing weighted averaging with respect to a plurality of local components respectively corresponding to a plurality of transmission center frequencies. Weights for global components are set in advance in accordance with transmission center frequencies so as to reduce noise in the global components. Weights for local components are set in advance in accordance with transmission center frequencies so as to improve the continuity of a body tissue. The component decomposition unit 207 outputs the weighted averaging local component to the enhancing unit 209. The component decomposition unit 207 outputs the weighted averaging global component to the enhancing unit 209 and the frequency compounding unit 211.

More specifically, if, for example, two different transmission center frequencies (to be referred to as a high frequency and a low frequency hereinafter) are to be used, a weight for a global component concerning the high frequency is larger than a weight for a global component concerning the low frequency. In addition, a weight for a local component concerning the high frequency is smaller than a weight for a local component concerning the low frequency.

The enhancing unit 209 executes the processing (to be referred to as the enhancing processing hereinafter) of receiving the global component and the local component output from the component decomposition unit 207 and enhancing the local component output from the component decomposition unit 207. The enhancing processing improves the visibility of the local component (weighted averaging local component or selected local component) output from the component decomposition unit 207.

More specifically, the enhancing unit 209 executes, for example, edge detection with respect to the global component (weighted averaging global component or selected global component) output from the component decomposition unit 207. The enhancing unit 209 decides an edge degree by edge detection. The enhancing unit 209 forms a local component (to be referred to as an enhanced local component) enhanced by multiplying the local component (weighted averaging local component or selected local component) output from the component decomposition unit 207 by the edge degree as a coefficient (to be referred to as an enhancement coefficient hereinafter). The enhancing unit 209 outputs an enhanced local component $L_{en}$ to the frequency compounding unit 211. The enhancing unit 209 forms an enhanced local component by enhancing the local component based on the global component and the local component output from the component decomposition unit 207.

The edge detection method used by the enhancing unit 209 is, for example, an edge detection filter such as a Canny filter or Sobel filter. Note that the enhancing unit 209 may multiply the local component (weighted averaging local component or selected local component) output from the component decomposition unit 207 by a predetermined fixed coefficient without using edge information (edge degree). Enhancing local components representing the fine pattern of a body tissue in this manner can depict the body tissue more clearly, thereby improving the visibility.

The frequency compounding unit 211 forms a compound image by combining global components and enhanced local components corresponding to different transmission center frequencies. More specifically, the frequency compounding unit 211 obtains a luminance value (pixel value) $v_{out}(t, i)$ of the pixel i after combining by adding the global component output from the component decomposition unit 207 and an enhanced local component $L_{en}(t, i)$ output from the enhancing unit 209.

$$v_{out}(t,i)=S(t,i)+L_{en}(t,i)$$

That is, it is possible to form a compound image with higher visibility by adding global components with low noise and enhanced local components which exhibit high continuity of a body tissue and improve the body tissue drawing performance.

(Frequency Compounding Function)

A frequency compounding function is a function of decomposing a plurality of ultrasonic images generated by frequency-difference scans into global components and local components and forming a compound image by combining the enhanced local components obtained by enhancing the selected or weighted averaging local components in accordance with edge degrees and the selected or weighted averaging global components. Processing concerning the frequency compounding function (to be referred to as frequency compounding processing hereinafter) will be described below.

Figure 7:
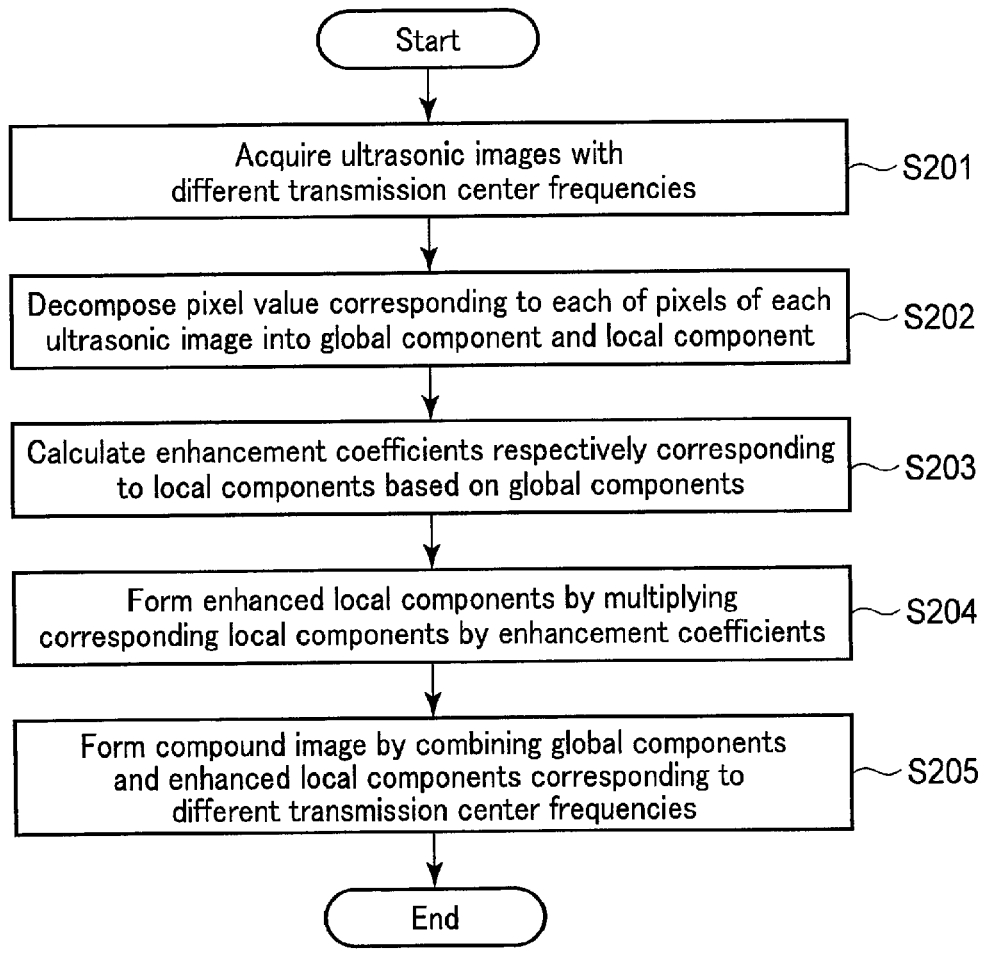
FIG. 7 is a flowchart showing an example of a procedure for frequency compounding processing according to the second embodiment.

FIG. 7 is a flowchart showing a procedure for frequency compounding processing.

The acquisition unit 10 acquires a plurality of ultrasonic images with different transmission center frequencies (step S201). When a medical image processing apparatus 5 is to execute this function, the apparatus acquires a plurality of ultrasonic images with different transmission center frequencies from an ultrasonic diagnostic apparatus, medical image archiving apparatus, or the like via an interface unit 50 or the acquisition unit 10. The data of these ultrasonic images is the image data of two or more ultrasonic images corresponding to a plurality of ultrasonic scans executed while a transmission center frequency is changed, and are used for the enhancement of local components, the forming of a compound image, and the like.

The data of each acquired ultrasonic image is decomposed into global components and local components, and proper global components and local components are output to the enhancing unit 209 (step S202). That is, a pixel value corresponding to each of a plurality of pixels of each of a plurality of ultrasonic images is decomposed into a global component and a local component.

A plurality of enhancement coefficients respectively corresponding to a plurality of local components are calculated based on global components (step S203). Enhanced local components are formed by multiplying the corresponding local components by the calculated enhancement coefficients (step S204). A compound image is formed by adding (combining) the global components and the enhanced local components (step S205).

According to the above arrangement, the following effects can be obtained.

The ultrasonic diagnostic apparatus 1 according to this embodiment can decompose each of a plurality of pixel values respectively corresponding to a plurality of pixels of a plurality of ultrasonic images generated based on frequency-difference scans into a global component and a local component. The ultrasonic diagnostic apparatus 1 then can form enhanced local components by multiplying selected or weighted averaging local components by the enhancement coefficients calculated based on the selected or weighted averaging local components. In addition, the ultrasonic diagnostic apparatus 1 can form a compound image by combining selected or weighted averaging global components and the enhanced local components with different transmission center frequencies.

With this operation, this ultrasonic diagnostic apparatus can display a compound image with the continuity of a body tissue being improved and the fine pattern of the body tissue being enhanced while suppressing the influence of noise in the third region and the influence of random noise on the overall ultrasonic image.

As described above, the ultrasonic diagnostic apparatus 1 can display an ultrasonic image with an improved body tissue drawing performance while suppressing noise.

When the technical idea of the ultrasonic diagnostic apparatus 1 is to be implemented in the medical image processing apparatus 5 as a modification of the above embodiment, the apparatus includes, for example, constituent elements within the two-dot dashed line in the block diagram of FIG. 6. In this case, a plurality of processes concerning frequency compounding processing are the same as those in the second embodiment.

Third Embodiment

The following is a difference from the first and second embodiments. First of all, a plurality of ultrasonic images with different beam directions and different transmission center frequencies are acquired. A plurality of spatial compound images with different transmission center frequencies are formed by applying spatial compounding processing to the plurality of ultrasonic images with different beam directions. In addition, a compound image is formed by applying frequency compounding processing to the plurality of spatial compound images with different transmission center frequencies. Note that the first region ($\Omega(i)$), the second region (M×N), and a third region $\psi(i)$ may or may not have the same size.

Figure 8:
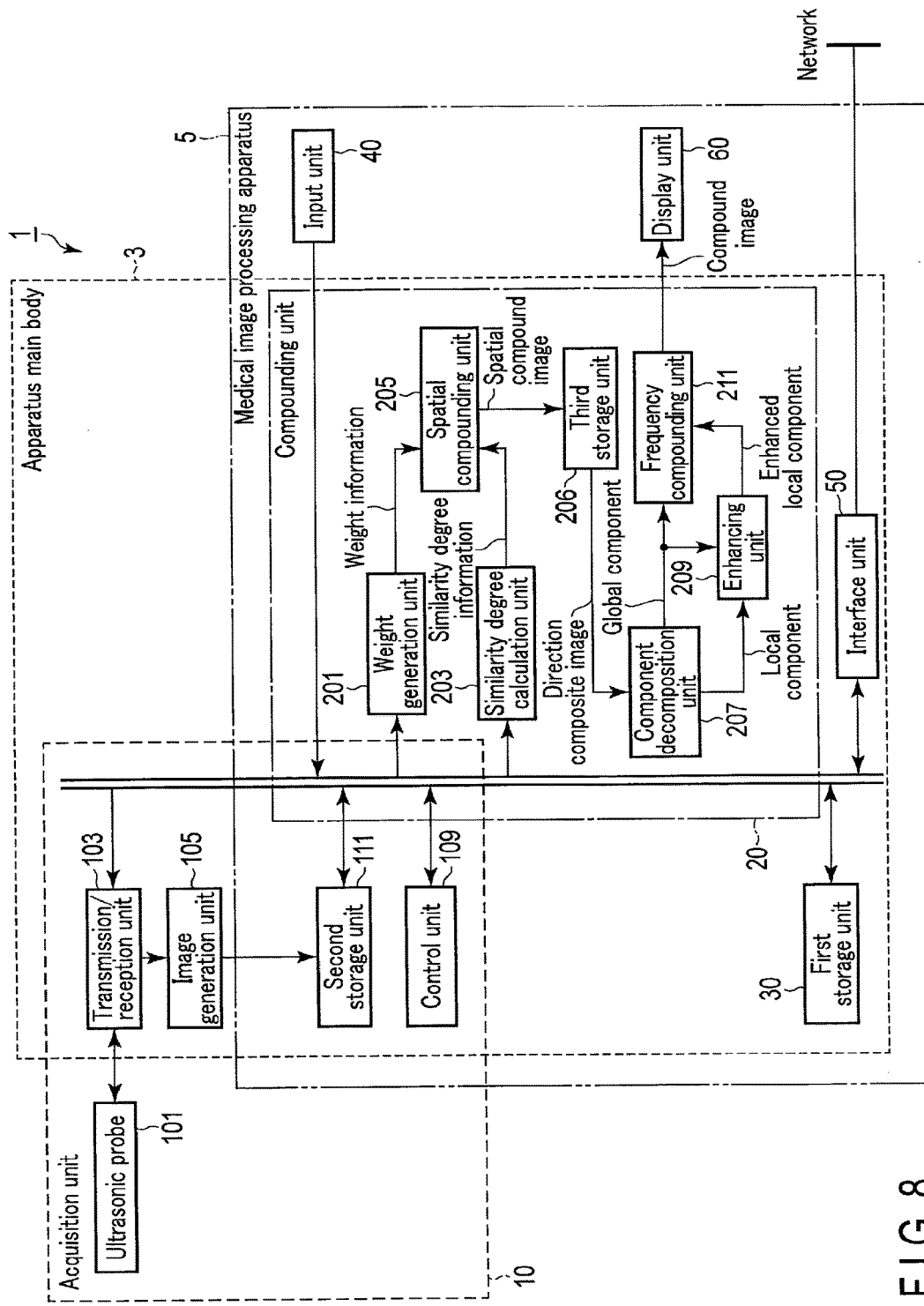
FIG. 8 is a block diagram showing the arrangement of an ultrasonic diagnostic apparatus 1 according to the third embodiment.

FIG. 8 is a block diagram showing an example of the arrangement of the third embodiment. The third embodiment is configured to combine the data of a plurality of ultrasonic images obtained by controlling a beam direction and a transmission center frequency and output the resultant data. Note that the arrangements of an acquisition unit 10 and a display unit 60 are the same as those in the first and second embodiments. Note that the second storage unit 107 included in the acquisition unit 10 in the first and second embodiments corresponds to a second storage unit 111 in the third embodiment. The data of a plurality of ultrasonic images input from the acquisition unit 10 to a compounding unit 20 is the data of a plurality of ultrasonic images corresponding to two or more directions and two or more transmission frequencies which are obtained by controlling a beam direction and a transmission center frequency.

The compounding unit 20 includes a weight generation unit 201, a similarity degree calculation unit 203, a spatial compounding unit 205, a third storage unit 206, a component decomposition unit 207, an enhancing unit 209, and a frequency compounding unit 211. The weight generation unit 201 generates weight information to be assigned to each beam direction, with respect to the data of a plurality of ultrasonic images corresponding to different beam directions and different transmission center frequencies which are obtained by the acquisition unit 10, by using a cumulative distribution in a pixel block (the first region $\Omega(i)$) including each pixel i and surrounding pixels. Assume that this weight information generation method is the same as that in the first embodiment.

Note that the weight generation unit 201 may adaptively select each weight information set generated from the data of a plurality of ultrasonic images corresponding to different transmission center frequencies and use it as weight information corresponding to each pixel of an ultrasonic image associated with another transmission center frequency. For example, an ultrasonic image corresponding to a low transmission center frequency of a plurality of transmission center frequencies contains high speckle noise, and hence the noise may be erroneously recognized as a body tissue signal. On the other hand, an ultrasonic image corresponding to a high transmission center frequency of the plurality of transmission center frequencies contains speckle appearing as a fine pattern. For these reasons, the weight generation unit 201 may generate weight information by using ultrasonic images corresponding to high transmission center frequencies of a plurality of transmission center frequencies.

The similarity degree calculation unit 203 calculates a similarity degree for each pixel at the same position on each of a plurality of ultrasonic images respectively corresponding to a plurality of beam directions, and generates similarity degree information. Assume that the similarity degree information generation method is the same as that in the first embodiment.

The spatial compounding unit 205 forms spatial compound images respectively corresponding to a plurality of transmission center frequencies by combining ultrasonic images for the respective beam directions by using weight information and similarity degree information. The plurality of formed spatial compound images are held in the third storage unit 206.

The component decomposition unit 207 decomposes the data of each of a plurality of spatial compound images respectively corresponding to a plurality of different transmission center frequencies into global components and local components, corrects (e.g., performs weighted averaging) the global components and the local components, and outputs the corrected components. Assume that the decomposition method and the setting method are the same as those in the second embodiment.

The enhancing unit 209 enhances decomposed local components by using global components. Assume that the enhancing method is the same as that in the second embodiment.

The frequency compounding unit 211 forms one compound image by adding and combining formed enhanced local components and global components.

(Spatial-Frequency Compounding Function)

A spatial-frequency compounding function is a function of forming spatial compound images by applying the spatial compounding function to a plurality of ultrasonic images with different beam directions of a plurality of ultrasonic images generated by anisotropic scans and frequency-difference scans, and then forming a compound image by applying the frequency compounding function to the plurality of spatial compound images with different transmission center frequencies. Processing associated with the spatial-frequency compounding function (to be referred to as spatial-frequency compounding processing hereinafter) will be described below.

Figure 9:
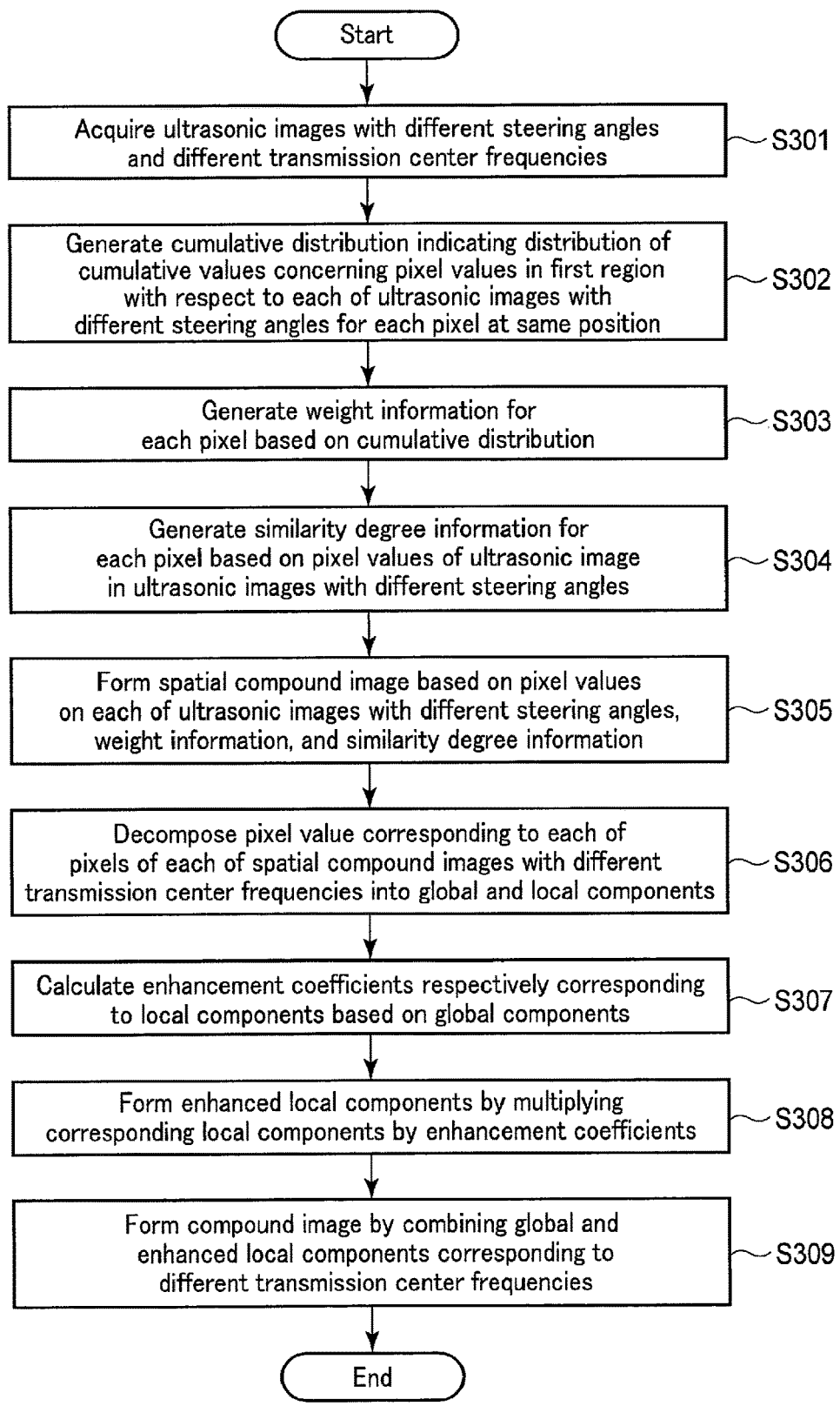
FIG. 9 is a flowchart showing an example of a procedure for spatial-frequency compounding processing according to the third embodiment.

FIG. 9 is a flowchart showing an example of a procedure for spatial-frequency compounding processing.

The acquisition unit 10 acquires a plurality of ultrasonic images with different steering angles (beam directions) and different transmission center frequencies by anisotropic scans and frequency-difference scans (step S301). The data of these ultrasonic images is the data of two or more ultrasonic images obtained while a beam direction and a transmission center frequency are changed, and are used for the enhancement of local components, the forming of a compound image, and the like.

A cumulative distribution in a pixel block (the first region $\Omega(i)$) including surrounding pixels for each pixel is generated by using the ultrasonic image data (step S302). More specifically, a cumulative distribution indicating the distribution of the cumulative values of a plurality of pixel values in the first region is generated, for each pixel at the same position with respect to each of a plurality of ultrasonic images with different steering angles.

Weight information to be assigned to each pixel and each beam direction is generated from the height (the magnitude of $h(t-k, i)$) of a bin of the cumulative distribution generated for each pixel (step S303). That is, weight information for each pixel is generated based on a cumulative distribution.

Similarity degree information is generated by calculating a similarity degree from the data of a plurality of ultrasonic images corresponding to a plurality of beam directions (step S304). More specifically, similarity degree information corresponding to each pixel of a plurality of ultrasonic images with different steering angles is generated based on pixel values on the ultrasonic images.

A spatial compound image is formed by weighted averaging of the data of ultrasonic images corresponding to the respective beam directions using the weight information and the similarity degree information. At this time, a spatial compound image is formed for each transmission center frequency band (step S305). That is, a spatial compound image is generated based on the pixel values on each of ultrasonic images with different steering angles, weight information, and similarity degree information.

A plurality of pixel values in the data of each of a plurality of spatial compound images are decomposed into global components and local components, and proper global components and local components are output to the enhancing unit 209 (step S306). Note that the global components are also output to the frequency compounding unit 211. More specifically, a pixel value corresponding to each of a plurality of pixels of each of a plurality of spatial compound images with different transmission center frequencies is decomposed into a global component and a local component.

Enhancement coefficients by which local components are to be multiplied are decided by using global components (step S307). That is, a plurality of enhancement coefficients respectively corresponding to the plurality of local components are calculated based on the global components.

Enhanced local components are formed by using the enhancement coefficients (step S308). That is, enhanced local components are formed by multiplying the corresponding local components by the enhancement coefficients.

A compound image is formed by adding the global components and the enhanced local components (step S309). That is, a compound image is formed by combining the global components and the enhanced local components corresponding to different transmission center frequencies.

According to the above arrangement, the following effects can be obtained.

An ultrasonic diagnostic apparatus 1 according to this embodiment can form spatial compound images by applying the spatial compounding function to a plurality of ultrasonic images with different beam directions of a plurality of ultrasonic images generated by anisotropic scans and frequency-difference scans, and then can form a compound image by applying the frequency compounding function to the plurality of spatial compound images with different transmission center frequencies.

With this operation, the ultrasonic diagnostic apparatus 1 can display a compound image with the continuity of a body tissue being improved and the fine pattern of the body tissue being enhanced while suppressing the influence of random noise on an entire ultrasonic image, artifacts over a region larger than the rectangular region (first region $\Omega(i)$), and noise in the third region.

As described above, the ultrasonic diagnostic apparatus 1 can display an ultrasonic image with an improved body tissue drawing performance while suppressing noise.

When the technical idea of the ultrasonic diagnostic apparatus 1 is to be implemented in a medical image processing apparatus 5 as a modification of the above embodiment, the apparatus includes, for example, constituent elements within the two-dot dashed line in the block diagram of FIG. 8. In this case, a plurality of processes concerning spatial-frequency compounding processing are the same as those in the third embodiment.

Fourth Embodiment

The following is a difference from the first to third embodiments. First of all, a plurality of ultrasonic images with different beam directions and different transmission center frequencies are acquired. A plurality of frequency compound images with different beam directions are generated by applying frequency compounding processing to the plurality of ultrasonic images with different transmission center frequencies. In addition, a compound image is formed by applying spatial compounding processing to the plurality of frequency compound images with different beam directions. Note that the first region ($\Omega(i)$), the second region (M×N), and a third region $\psi(i)$ may or may not have the same size.

FIG. 10 is a block diagram showing an example of the arrangement of the fourth embodiment. The fourth embodiment is configured to combine the data of a plurality of ultrasonic images obtained by controlling a beam direction and a transmission center frequency and output the resultant data. Note that the arrangements of an acquisition unit 10 and a display unit 60 are the same as those in the first to third embodiments. Note that the second storage unit 107 included in the acquisition unit 10 in the first and second embodiments corresponds to a second storage unit 111 in the fourth embodiment. The data of a plurality of ultrasonic images input from the acquisition unit 10 to a combining unit 20 is the data of a plurality of ultrasonic images corresponding to two or more directions and two or more transmission frequencies which are obtained by controlling a beam direction and a transmission center frequency.

The compounding unit 20 includes a weight generation unit 201, a similarity degree calculation unit 203, a spatial compounding unit 205, a third storage unit 206, component decomposition unit 207, an enhancing unit 209, and a frequency compounding unit 211.

The component decomposition unit 207 decomposes the data of each of a plurality of ultrasonic images respectively corresponding to a plurality of different transmission center frequencies into global components and local components, corrects (e.g., performs weighted averaging) the global components and the local components, and outputs the corrected components. Assume that the decomposition method and the setting method are the same as those in the second embodiment.

The enhancing unit 209 enhances decomposed local components by using global components. Assume that the enhancing method is the same as that in the second embodiment.

The frequency compounding unit 211 generates a plurality of frequency compound images with different beam directions by adding and combining formed enhanced local components and global components. The plurality of formed frequency compound images are held in the third storage unit 206.

The weight generation unit 201 generates weight information to be assigned to each pixel and each beam direction, with respect to the data of a plurality of frequency compound images with different beam directions, by using a cumulative distribution in a pixel block (the first region $\Omega(i)$) including each pixel i and surrounding pixels. Assume that this weight information generation method is the same as that in the first embodiment.

The similarity degree calculation unit 203 calculates a similarity degree for each pixel at the same position on each of a plurality of frequency compound images respectively corresponding to a plurality of beam directions, and generates similarity degree information. Assume that the similarity degree information generation method is the same as that in the first embodiment.

The spatial compounding unit 205 forms one compound image by combining frequency compound images corresponding to a plurality of beam directions by using weight information and similarity degree information.

(Frequency-Spatial Compounding Function)

A frequency-spatial compounding function is a function of forming frequency compound images by applying the frequency compounding function to a plurality of ultrasonic images with different transmission center frequencies of a plurality of ultrasonic images generated by anisotropic scans and frequency-difference scans, and then forming a compound image by applying the spatial compounding function to the plurality of frequency compound images with different beam directions. Processing associated with the frequency-spatial compounding function (to be referred to as frequency-spatial compounding processing hereinafter) will be described below.

FIG. 11 is a flowchart showing an example of a procedure for frequency-spatial compounding processing.

The acquisition unit 10 acquires a plurality of ultrasonic images with different steering angles (beam directions) and different transmission center frequencies by anisotropic scans and frequency-difference scans (step S401). The data of these ultrasonic images is the data of two or more ultrasonic images obtained while a beam direction and a transmission center frequency are changed, and are used for the generation of weight information, the enhancement of local components, the forming of a compound image, and the like.

The data of each of a plurality of ultrasonic images is decomposed into global components and local components, and proper global components and local components are output to the enhancing unit 209 (step S402). Note that the global components are also output to the frequency compounding unit 211. More specifically, a pixel value corresponding to each of a plurality of pixels of each of a plurality of spatial compound images with different transmission center frequencies is decomposed into a global component and a local component.

Enhancement coefficients by which local components are to be multiplied are decided by using global components (step S403). That is, a plurality of enhancement coefficients respectively corresponding to the plurality of local components are calculated based on the global components.

Enhanced local components are formed by using the enhancement coefficients (step S404). That is, enhanced local components are formed by multiplying the corresponding local components by the enhancement coefficients.

A frequency compound image is formed by adding the global components and the enhanced local components (step S405). That is, one frequency compound image is formed for each beam direction by combining the global components and the enhanced local components respectively corresponding to different transmission center frequencies.

A cumulative distribution in a pixel block (the first region $\Omega(i)$) including surrounding pixels for each pixel is generated by using the frequency compound image data (step S406). More specifically, a cumulative distribution indicating the distribution of the cumulative values of a plurality of pixel values in the first region is generated for each pixel at the same position with respect to each of a plurality of ultrasonic images with different steering angles.

Weight information to be assigned for each pixel and each beam direction is generated based on the cumulative distribution generated for each pixel (step S407). That is, weight information for each pixel is generated based on a cumulative distribution.

Similarity degree information is generated by calculating a similarity degree from the data of a plurality of frequency compound images corresponding to a plurality of beam directions (step S408). More specifically, similarity degree information concerning each pixel of a plurality of ultrasonic images with different steering angles is generated based on pixel values on the ultrasonic images.

A compound image is formed by weighted averaging of the data of frequency compound images in the respective beam directions using the weight information and similarity degree information (step S409). That is, a compound image is formed based on pixel values on each of frequency compound images with different steering angles and similarity degree information.

Note that both the third and fourth embodiments are configured to input images obtained while a beam direction and a transmission center frequency are changed, and hence the respective embodiments can be switched each other in accordance with images.

According to the above arrangement, the following effects can be obtained.

An ultrasonic diagnostic apparatus 1 according to this embodiment can form frequency compound images by applying the frequency compounding function to a plurality of ultrasonic images with different transmission center frequencies of a plurality of ultrasonic images generated by anisotropic scans and frequency-difference scans, and then can form a compound image by applying the spatial-frequency compounding function to the plurality of frequency compound images with different beam directions.

With this operation, the ultrasonic diagnostic apparatus 1 can display a compound image with the continuity of a body tissue being improved and the fine pattern of the body tissue being enhanced while suppressing the influence of random noise on an entire ultrasonic image, artifacts over a region larger than the rectangular region (first region $\Omega(i)$), and noise in the third region.

As described above, the ultrasonic diagnostic apparatus 1 can display an ultrasonic image with an improved body tissue drawing performance while suppressing noise.

When the technical idea of the ultrasonic diagnostic apparatus 1 is to be implemented in a medical image processing apparatus as a modification of the above embodiment, the apparatus includes, for example, constituent elements within the two-dot dashed line in the block diagram of FIG. 10. In this case, a plurality of processes concerning frequency-spatial compounding processing are the same as those in the fourth embodiment.

In addition, each function (the spatial compounding function, frequency compounding function, spatial-frequency compounding function, the frequency-spatial compounding function, or the like) according to the first to fourth embodiments can be implemented by installing a program for executing the processing in a computer such as a workstation and loading it in the memory. In this case, the program which can cause the computer to execute this method can be distributed by being stored in storage media such as magnetic disks (hard disks and the like), optical disks (CD-ROMs, DVDs, and the like), and semiconductor memories.

Furthermore, each embodiment can also be used to perform volume scanning of continuously obtaining tomographic images generated by using each function in each embodiment in the depth direction. Note that each unit according to the first to fourth embodiments may be formed from one or a plurality of electronic circuits (e.g., processors such as a CUP (Central Processing Unit) and an MPU (Micro Processing Unit), memories, and electronic circuits such as an ASIC (Application Specific Integrated Circuits) and an FPGA (Field Programmable Gate Array).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An ultrasound medical image processing apparatus comprising:
   processing circuitry configured to
      obtain a plurality of images, each of the plurality of images acquired using respective values of one or more scanning parameters for an ultrasonic wave transmitted into a target region that differ from values of the one or more scanning parameters used to acquire other of the plurality of images, the one or more scanning parameters including at least one of a center frequency of the transmitted ultrasonic wave and a steering angle of the transmitted ultrasonic wave, decompose each of the plurality of images into a global component and a local component, the global component indicating a global stricture in the target region and the local component indicating a local structure in the target region, wherein, for each one of the plurality of images, the global component of each one of the plurality of images is determined by applying a spatial low-pass filter to each one of the plurality of images to generate respective pixels of the global component that represent a moving average of pixel values in each one of the plurality of images, and the local component of each one of the plurality of images is determined using differences between each one of the plurality of images and the corresponding global component, generate enhanced local components by performing edge detection on the respective global components to generate enhancement coefficients representing a measure of edge degree, and multiplying the enhancement coefficients with the respective local components, and form a compound image that emphasizes edges in a body tissue in the target region using the global components and the enhanced local components; and a display to display the compound image in which the edge is emphasized.

2. The apparatus according to claim 1, wherein the one or more scanning parameters include the center frequency of the transmitted ultrasonic wave.

3. The apparatus according to claim 1, wherein the one or more scanning parameters include the steering angle of the transmitted ultrasonic wave.

4. The apparatus according to claim 3, wherein the processing circuitry is further configured to generate, for the each pixel of the each image of the plurality of images, weight information corresponding to a pixel of an image of the plurality of images using a smoothing filter applied to the image, the smoothing filter representing a moving average of a plurality of pixel values of the respective image in a predetermined region including the pixel, and the forming of the compound image includes using the weight information to combine images of the plurality of images having a first value of the steering angle with other images of the plurality of images having different values of the steering angle.

5. The apparatus according to claim 4, wherein the processing circuitry is configured to calculate, for each group of images that was acquired using the same steering-angle value, a similarity degree at each pixel based on pixel values of the group of images that was acquired using the same steering-angle value, and perform the combining of the compound images by combining the compound images, which correspond to respective values of the steering angle, using the similarity degrees and the weight information.

6. The apparatus according to claim 1, wherein the one or more scanning parameters include the center frequency of the transmitted ultrasonic the steering angle of the transmitted ultrasonic wave, and the processing circuitry is further configured to decompose, for each respective steering-angle value of the values of the steering angle of the transmitted ultrasonic wave and for each group of images of the plurality of images that was acquired using a same steering-angle value, a pixel value of each of a plurality of pixels of each image of the group of images that was acquired using the same steering-angle value in to a pixel value of a global component of global components corresponding to the steering-angle value and in to a pixel value of a local component of local components corresponding to the steering-angle value, form, for each of the steering-angle values, a respective compound image corresponding to a steering-angle value by combining global components that correspond to the steering-angle value and to various center-frequency values with local components that correspond to the steering-angle value and to the various center-frequency values, generate weight information for the each pixel of each of the compound images based on applying a smoothing filter to the respective compound images, the smoothing filter representing a filtered pixel value of a compound image as a moving average of pixel values in a predetermined region of the compound image including the pixel of the filtered pixel value, and combine the compound images, which correspond to respective values of the steering angle, using the weight information.

7. The apparatus according to claim 1, wherein the processing circuitry is further configured to generate weight information for each pixel of each of the plurality of images based on a cumulative value of pixel values of a plurality of pixels, and perform the forming of the compound image using the weight information.

8. An ultrasound medical image processing apparatus comprising:

processing circuitry configured to obtain a plurality of images, each of the plurality of images acquired using respective values of two or more scanning parameters for an ultrasonic wave transmitted into a target region, for each of the plurality of images at least one value of the two or more scanning parameters differs from values of the two or more scanning parameters used when acquiring all others of the plurality of images, the two or more scanning parameters including at least a center frequency of the transmitted ultrasonic wave, generate, for each respective center-frequency value of the values of the center frequency of the transmitted ultrasonic wave and for each group of images of the plurality of images that was acquired using a corresponding center-frequency value, weight information for each of a plurality of pixels of each image of the group of images acquired using the corresponding center-frequency value, form respective compound images for each of the corresponding center-frequency values, each of the compound images being based on the weight information and the group of images that was acquired the corresponding center-frequency value, decompose the compound images into respective global components and respective local components, by decomposing a pixel value of each of a plurality of pixels of each of the compound images in to a pixel value of the corresponding global component and in to a pixel value of the corresponding local component, and combine the global components and the local components corresponding to the respective values of the center frequency.

9. The apparatus according to claim 8, wherein the processing circuitry is further configured to form enhanced local components by enhancing the local components based on the global components and the local components, and the combining of the global components and the local components is performed by combining the enhanced local components and the global components corresponding to the respective values of the center frequency.

10. An ultrasound medical diagnosis apparatus comprising:

a scanner configured to generate a plurality of images by transmitting into a target region an ultrasonic wave using one or more scanning parameters to a target region, the one or more scanning parameters including at least one of a center frequency of the transmitted ultrasonic wave and a steering angle of the transmitted ultrasonic wave, and each of the plurality of images being generated using at least one value of one or more scanning parameters that differs from values of the one or more scanning parameters used to generate all other of the plurality of images; and processing circuitry configured to decompose each of the plurality of images into a global component, which indicates a global structure in the target region, and into a local component, which indicates a local structure in the target region, wherein, for each one of the plurality of images, the global component of each one of the plurality of images is determined by applying a smoothing filter to each one of the plurality of images to generate respective pixel values of the global component that represent a moving average of pixel values in each one of the plurality of images, and the local component of each one of the plurality of images is determined using differences between each one of the plurality of images and the corresponding global component, generate enhanced local components by performing edge detection on the respective global components to generate enhancement coefficients representing a measure of edge degree, and multiplying the enhancement coefficients with the respective local components, and form a compound image that emphasizes edges in a body tissue in the target region using the global components with the enhanced local components; and a display to display the compound image in which the edge is emphasized.

11. The apparatus according to claim 1, wherein the processing circuitry is configured to select, for each of the plurality of images, one of the global component and the local component, form an enhanced local component by enhancing the local component of at least one image of the plurality of images for which the local component is selected, among the plurality of images, and perform the forming of the compound image using the enhanced local component.

12. The apparatus according to claim 1, wherein the one or more scanning parameters include the center frequency of the transmitted ultrasonic wave and the steering angle of the transmitted ultrasonic wave, and the processing circuitry is configured to perform the forming of the compound image using global components and enhanced local components corresponding a first value of a plurality of values of the steering angle, and form other compound images using global components and enhanced local components corresponding other values of the plurality of values of the steering angle.

13. An ultrasound medical image processing apparatus comprising:

processing circuitry configured to obtain a plurality of images, each of the plurality of images acquired using respective values of one or more scanning parameters for an ultrasonic wave transmitted into a target region that differ from values of the one or more scanning parameters used to acquire other of the plurality of images, the one or more scanning parameters including at least one of a center frequency of the transmitted ultrasonic wave and a steering angle of the transmitted ultrasonic wave, decompose each of the plurality of images into a global component and a local component, the global component indicating a global structure in the target region and the local component indicating a local structure in the target region, wherein, for each one of the plurality of images, the global component of each one of the plurality of images is determined by applying a spatial low-pass filter to each one of the plurality of images to generate respective pixels of the global component that represent a moving average of pixel values in each one of the plurality of images, and the local component of each one of the plurality of images is determined using differences between each one of the plurality of images and the corresponding global component, form a first image by performing weighted averaging of the global components using weighting information specific for each pixel of each of the plurality of images;

form a second image by performing weighted averaging of the local components using weighting information specific for each pixel of each of the plurality of images; and form a compound image using the first image and the second image.

14. The apparatus according to claim 13, wherein the processing circuitry is configured to enhance the second image using edge detection on the first image to generate an enhanced second image; and perform the forming of the compound image by combining the first image and the enhanced second image.

15. The apparatus according to claim 13, wherein the one or more scanning parameters include the center frequency of the transmitted ultrasonic wave.

16. The apparatus according to claim 13, wherein the one or more scanning parameters include the steering angle of the transmitted ultrasonic wave.

17. The apparatus according to claim 13, wherein
the one or more scanning parameters include the center frequency of the transmitted ultrasonic wave and the steering angle of the transmitted ultrasonic wave, and
the processing circuitry is configured to perform the forming of the compound image using global components and enhanced local components corresponding a first value of a plurality of values of the steering angle, and form other compound images using global components and enhanced local components corresponding other values of the plurality of values of the steering angle.

18. An ultrasound medical diagnosis apparatus comprising:
a scanner configured to generate a plurality of images acquired by transmitting into a target region an ultrasonic wave waves in different using one or more scanning parameters to a target region, the one or more scanning parameters including at least one of a center frequency of the transmitted ultrasonic wave and a steering angle of the transmitted ultrasonic wave, and each of the plurality of images being generated using at least one value of one or more scanning parameters that differs from values of the one or more scanning parameters used to generate all other of the plurality of images; and
processing circuitry configured to
decompose each of the plurality of images into a global component, which indicates a global structure in the target region, and into a local component, which indicates a local structure in the target region, wherein, for each one of the plurality of images,
the global component of each one of the plurality of images is determined by applying a smoothing filter to each one of the plurality of images to generate respective pixel values of the global component that represent a moving average of pixel values in each one of the plurality of images, and
the local component of each one of the plurality of images is determined using differences between each one of the plurality of images and the corresponding global component,
generate enhanced local components by performing edge detection on the respective global components to generate enhancement coefficients representing a measure of edge degree, and multiplying the enhancement coefficients with the respective local components;
form a first image by performing weighted averaging of the global components using weighting information specific for each pixel of each of the plurality of images;
form a second image by performing weighted averaging of the local components using weighting information specific for each pixel of each of the plurality of images; and
form a compound image using the first image and the second image.

* * * * *